United States Patent [19]

Pinede et al.

[11] Patent Number: 4,554,413

[45] Date of Patent: Nov. 19, 1985

[54] KEY TELEPHONE SYSTEM

[75] Inventors: Edouard Pinede, Norwalk; Serge Faublas, Monroe; Peter F. Stevens, Trumbull, all of Conn.

[73] Assignee: PKS/Communications, Inc., Milford, Conn.

[21] Appl. No.: 616,566

[22] Filed: May 31, 1984

[51] Int. Cl.[4] .......................... H04M 9/06; H04M 9/08
[52] U.S. Cl. ................. 179/99 M; 179/99 A; 179/99 R
[58] Field of Search ................. 179/99 R, 99 A, 99 E, 179/99 H, 99 LC, 99 LS, 99 M, 99 P, 18 EA, 18 GF, 18 B, 22

[56] References Cited

U.S. PATENT DOCUMENTS

| 3,943,301 | 3/1976 | Ervin | 179/99 R |
|---|---|---|---|
| 3,962,552 | 6/1976 | Reines et al. | 179/18 EA |
| 4,004,103 | 1/1977 | Liu et al. | 179/18 EA |
| 4,038,638 | 7/1977 | Hwang | 340/166 R |
| 4,188,511 | 2/1980 | Smith et al. | 179/99 A |
| 4,236,049 | 11/1980 | Tanihata et al. | 179/99 R |
| 4,245,214 | 1/1981 | Beirne | 340/166 R |
| 4,329,543 | 5/1982 | Danford | 179/1 HF |
| 4,376,875 | 3/1983 | Beirne | 179/18 B |
| 4,389,544 | 6/1983 | Wagner et al. | 179/2 DP |
| 4,412,102 | 10/1983 | Ogawa et al. | 179/99 M |

Primary Examiner—Gene Z. Rubinson
Assistant Examiner—Elio Di Vito
Attorney, Agent, or Firm—Barry R. Lipsitz

[57] ABSTRACT

A key telephone system uses four wires for transmission of voice and audio signals to and from the telephone stations and other components which are part of the system. A plurality of telephone stations are provided, each having a two wire audio input port, a separate two wire audio output port, and a data port. Communcation paths are established through a crosspoint matrix. The matrix includes a first group of addressable crosspoint switches for coupling selected transmit signal paths to selected first link points. A second group of such switches is provided for coupling selected receive signal paths to selected second link points. A third group of such switches couples selected first link points to selected second link points. A link searching routine determines which links are available for effecting communication paths. A minimizing function shares communication paths among common signals when possible.

17 Claims, 13 Drawing Figures

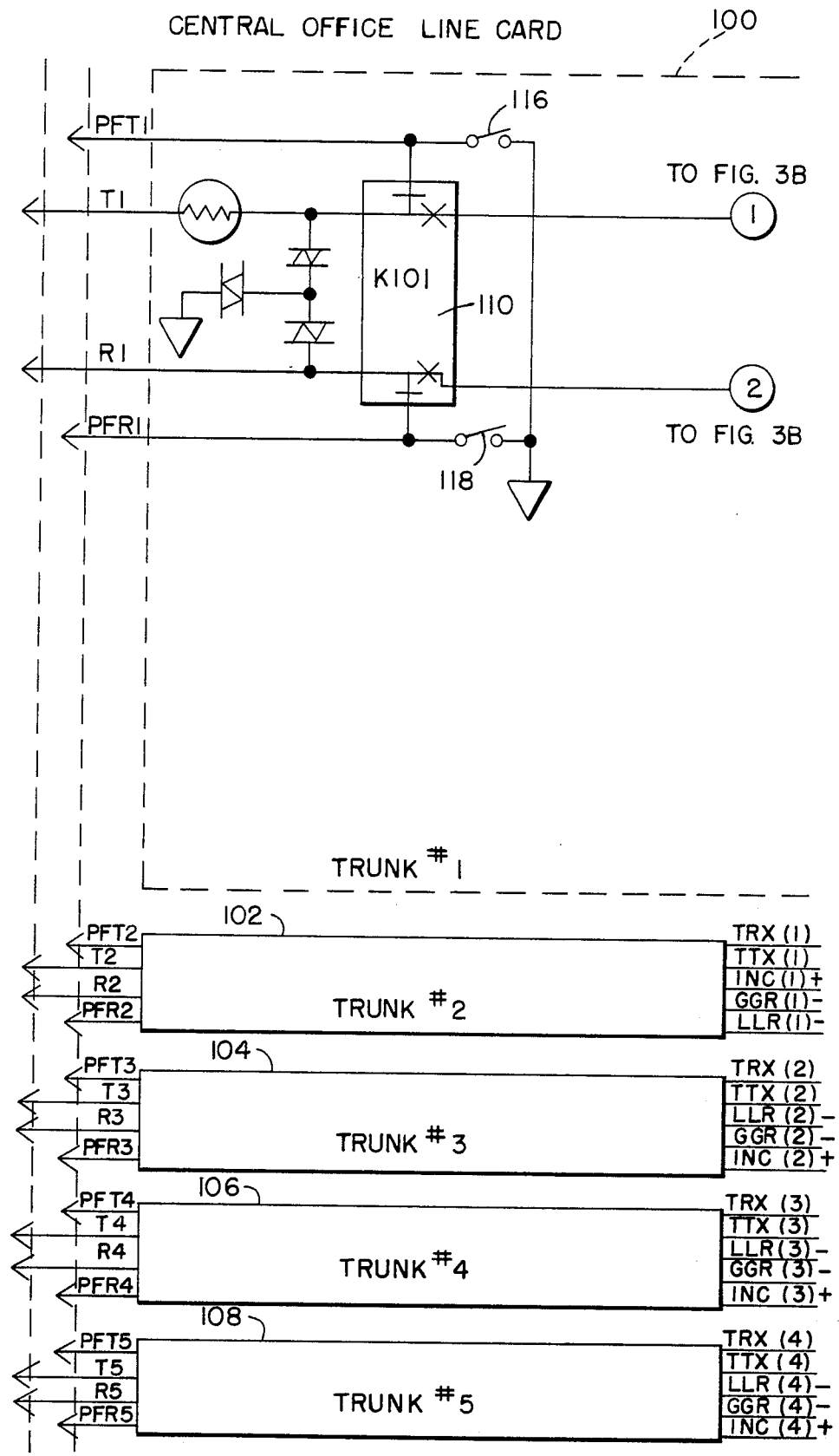

STATION INTERFACE CARD

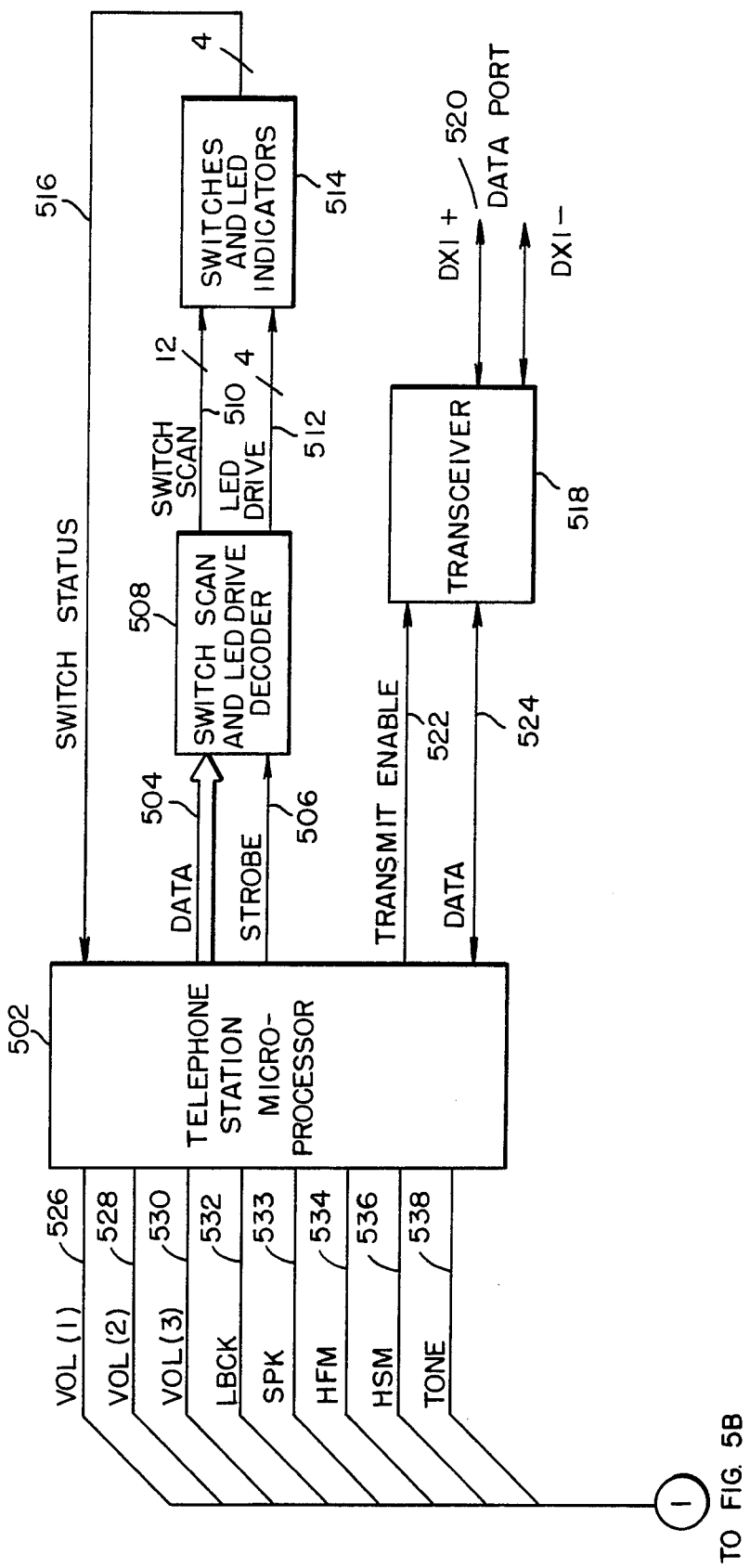

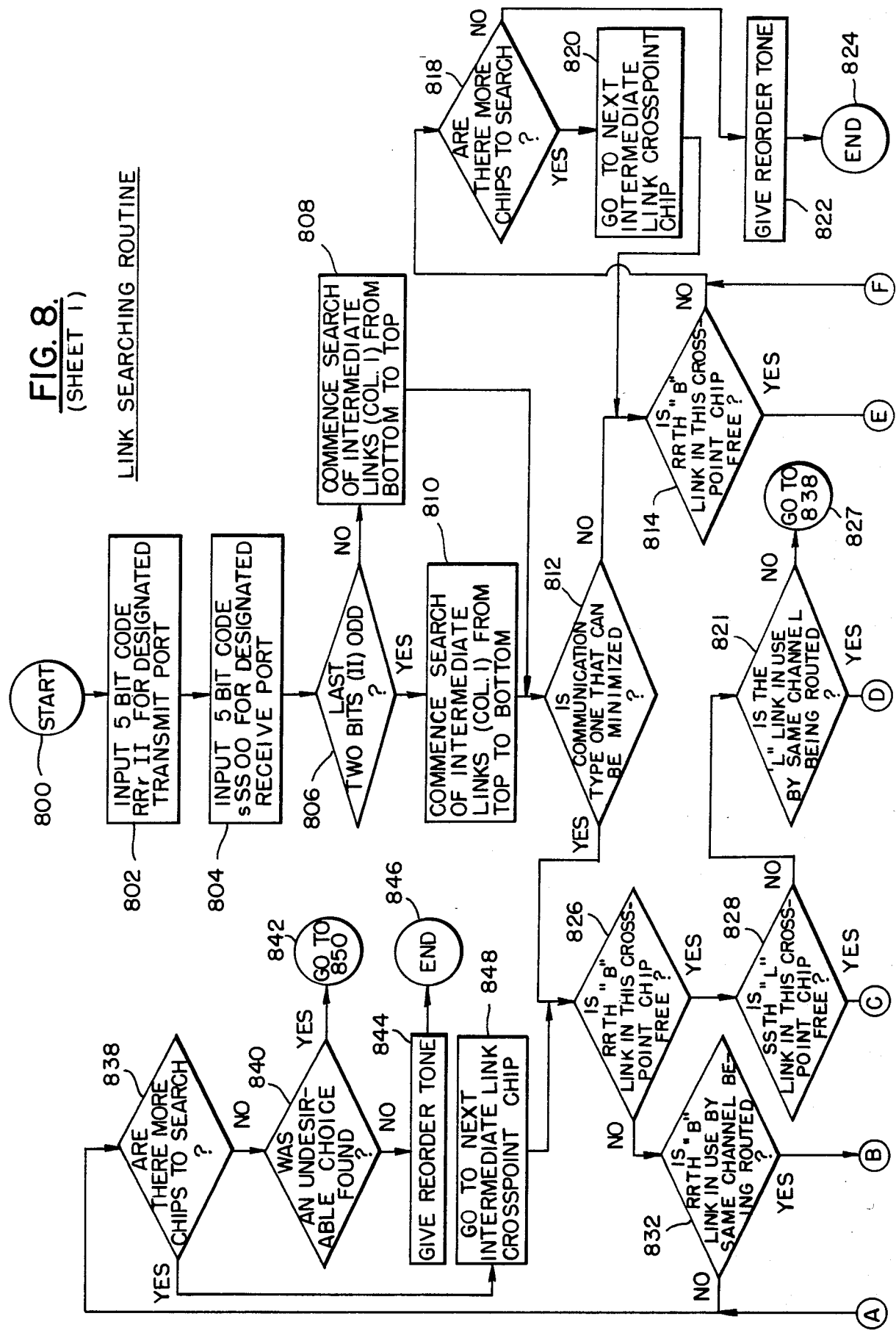

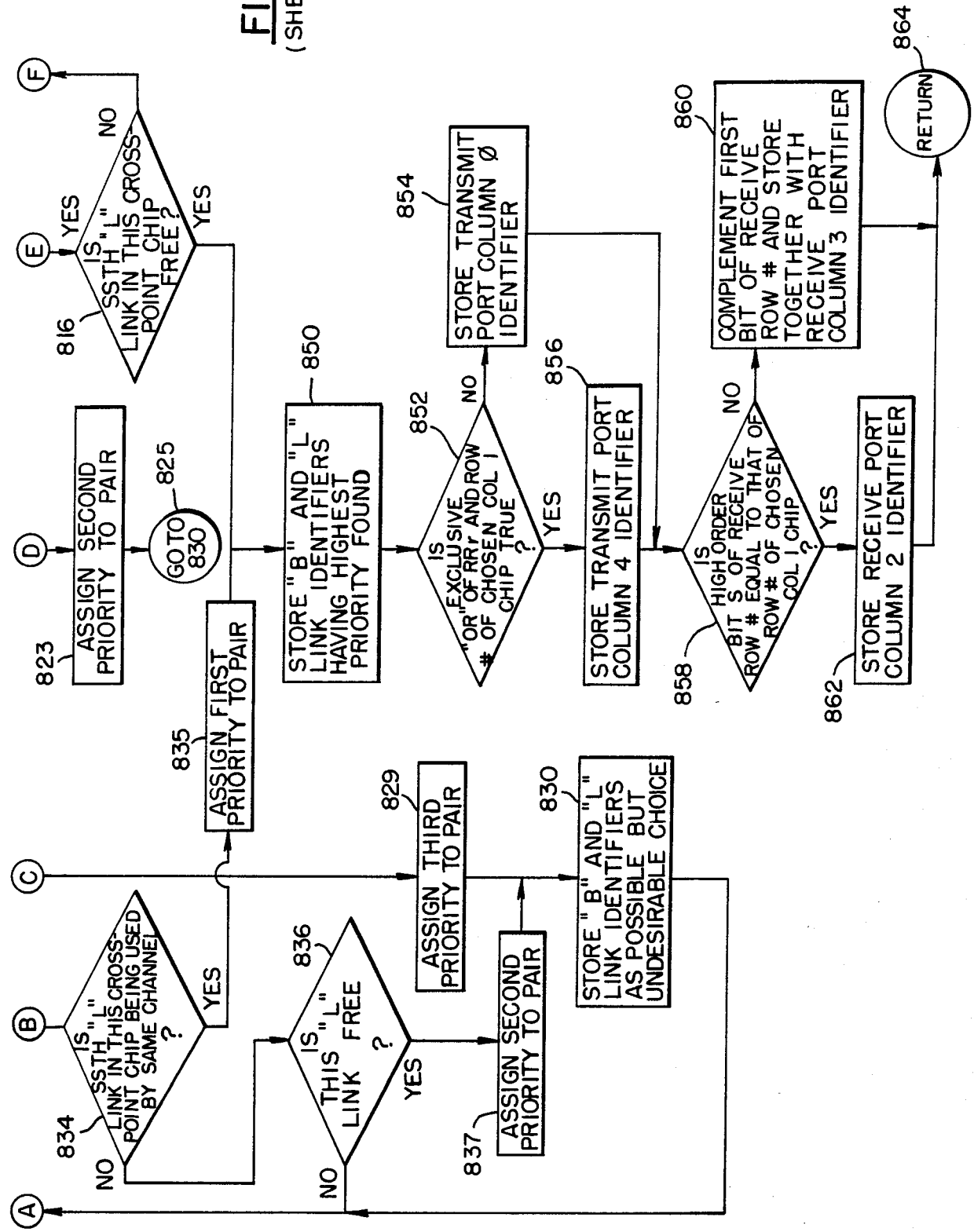
FIG. 8. (SHEET 2.)

KEY TELEPHONE SYSTEM

BACKGROUND OF THE INVENTION

The present invention relates to key telephone systems and more particularly to such a system which uses four wires for transmission of voice and audio signals to and from the telephone stations which are part of the system. The system of the present invention include a plurality of telephone stations each having a two wire audio input port, a separate two wire audio output port, and a data port. Duplex communication paths are established through a novel crosspoint matrix.

Key telephone systems generally comprise a plurality of telephone stations (also referred to as "telephone sets") and a central key switch unit ("KSU") which interconnects the telephone stations with each other and to outside telephone trunk lines. The KSU provides control functions for the key telephone system and establishes communication paths between telephone stations. When outside calls are involved, the KSU establishes communication paths between telephone stations and telephone trunk lines.

Each telephone trunk line comprises, at a minimum, two wires called a wire pair connected to the telephone company central office through a "local loop". One of the wires is called T (for tip) and the other is called R (for ring). The tip and ring designations refer to the tip and ring parts of the plugs used by a telephone operator in the manual switchboards used in the past.

The two wires scheme used in the past by the telephone company for connecting a telephone line to a telephone station has been maintained in key telephone systems for commercial use. Thus, in telephone stations used with modern key telephone systems, only two wires are typically used for the transmission and reception of audio (e.g. voice) communications to and from telephone stations. An additional two wires is generally used in such systems to transmit data among the telephone stations and the KSU. Such data transmission provides the necessary system control and enables the implementation of a variety of features provided in the telephone system. Thus, each telephone station in conventional key telephone systems interfaces with the KSU using only four wires; namely, a two wire pair for the audio communication and a two wire pair for the transmission of digital data.

Although coupling to each telephone station with only two wires for audio communications (a "two-wire" system) is efficient in terms of cable utilization and expense, each telephone station must contain circuitry to (1) separate audio input from audio output signals, (2) provide local switching for various system functions (such as hands-free communication), (3) provide for line balancing and compensation, (4) provide an acceptable sound level for every telephone conversation, and (5) provide the necessary isolation between the voice transmitter and receiver portions of the telephone station. Further, at the KSU end of this system, the use of only two wires for audio communication can lead to complications in achieving desirable system features, such as call announcing and conference calling.

It would be advantageous to provide an economical key telephone system in which the transmit and receive audio communication paths are completely isolated. Such an arrangement would eliminate the need for local switching at each telephone station to implement hands-free communication. Such structure would also eliminate the need for network circuitry within each telephone station to divide conventional single telephone transmission channels into two separate channels, one for transmit and the other for receive. Further, such a system would provide for call announcing without the need for switching within the telephone station and a conference calling capability which is implemented economically and in straightforward manner.

The present invention provides such a key telephone system through the use of a two wire audio input port and a separate two wire audio output port at each telephone station (a "four-wire" system). A novel crosspoint matrix is provided as part of the present key telephone system to interconnect transmit and receive signal paths and thereby complete duplex communication channels.

SUMMARY OF THE INVENTION

In accordance with the present invention, a key telephone system is provided which comprises a plurality to telephone stations each having a two wire audio input port, a separate two wire audio output port, and a data port. Centralized station interface means is coupled to each of the telephone stations for providing a station receive signal path for each two wire audio input port and a station transmit signal path for each two wire audio output port. Local loop interface means divides each of a plurality of telephone trunk lines into separate trunk transmit and trunk receive signal paths. Also provided are crosspoint matrix means, coupled between the centralized station interface means and the local loop interface means. The crosspoint matrix means interconnects station transmit signal paths to station receive signal paths, station transmit signal paths to trunk receive signal paths, and trunk transmit signal paths to station receive signal paths.

The crosspoint matrix means of the present invention includes a first group of addressable crosspoint switches for coupling selected transmit signal paths to selected first link points. A second group of addressable crosspoint switches is provided for coupling selected receive signal paths to selected second link points. A third group of addressable crosspoint switches couples selected first link points to selected second link points. Control means are provided for completing a duplex communication channel by addressing and actuating a first set of crosspoint switches from the first, second and third groups of such switches to effect a connection from a transmit signal path to a receive signal path across first and second link points, and a second set of crosspoint switches from said first, second and third groups to effect a connection from the reciprocal transmit signal path to the reciprocal receive signal path across first and second link points.

In order to complete a duplex communication channel between a first telephone station and a second telephone station in the key telephone system, the audio input port of the first telephone station will be coupled, through the crosspoint matrix, to the audio output port of the second telephone station. At the same time, the reciprocal signal path, i.e. the coupling of the output port of the first telephone station to the input port of the second telephone station, will be completed through the crosspoint matrix. By providing separate signal paths in each direction, complete isolation is maintained between the transmit and receive functions of each telephone station.

The system of the present invention can further comprise a microprocessor in each of the telephone stations, with the microprocessor data bus coupled to the telephone station data port. A system microprocessor also would be provided along with means for enabling it to determine the status of each telephone station by communicating with the telephone station microprocessors through the data ports. Such system would also provide means for enabling the system microprocessor to select, address and actuate the crosspoint switches necessary to complete duplex communication paths dictated by status information from the telephone stations. Data communication between the system microprocessor and the telephone station microprocessors, and between the system microprocessor and the crosspoint matrix, can be proivded by a peripherial controller.

The system of the present invention can further comprise means for detecting incoming calls on each of the telephone trunk lines, means for enabling the system microprocessor to monitor the incoming call detecting means, and means for enabling the system microprocessor to signal the presence of an incoming call to at least one telephone station. In a preferred embodiment, the presence of incoming calls is signaled to one or more designated telephone stations by providing an audible "ring" tone.

Also in a preferred embodiment, each of the telephone stations comprises a plurality of function switches and a telephone key pad. The status information provided by the telephone station microprocessor to the system microprocessor includes data that identifies switches and keys which are actuated at the telephone station. In this manner, the system microprocessor will know which switches and keys are being actuated by a user, and can take appropriate action. For example, when a telephone number is dialed on the telephone keypad, the system microprocessor will receive information indicative of the dialed number as part of the status information it receives from the dialing telephone station.

A further feature of the present invention comprises the use of centralized means, under the control of the system microprocessor, for generating dual-tone multi-frequency ("DTMF") tones in response to the actuation of keys at the telephone stations. Means are provided for coupling tones generated (in response to key actuations at individual telephone stations) to corresponding individual trunk receive signal paths via the crosspoint matrix means. In this manner, outgoing calls can be dialed by individual telephone stations using DTMF tone generating means shared by all of the telephone stations.

An audio amplifier and loudspeaker can be provided in each of the telephone stations and coupled to receive an audio input signal from the audio input port of the telephone station. Each such telephone station would also include hands-free microphone means coupled to transmit an audio signal through an audio amplifier to the audio output port of the telephone station. The loudspeaker and hands-free microphone arrangement enables an audio signal from a first telephone station, routed through the crosspoint matrix to a second telephone station, to be broadcast over the loudspeaker of the second telephone station. At the same time, an audio signal from the hands-free microphone means of the second telephone station would be routed through the crosspoint matrix to the first telephone station, where the signal would be heard through the handset receiver of the first telephone station. The audio signal from the hands-free microphone of the second telephone station could alternatively be output from the loudspeaker of the first telephone station.

In accordance with the present invention, means could also be provided for generating a call announce tone in response to status information from a first telephone station to indicate that a call is being placed to a second telephone station. The call announce tone would be coupled through the crosspoint matrix to the audio input port of the second telephone station, for broadcast over the second telephone station's loudspeaker. After broadcasting the call announce tone, a duplex communication channel would be completed between the first and second telephone stations so that a conversation could be held.

Multiplexing means can be provided to enable the establishment of a plurality of duplex communication channels across the crosspoint matrix concurrently. In fact, an important feature of the present invention is that the crosspoint matrix provides a non-blocking arrangement whereby all communication paths in the system can be used at the same time. The provision of such a non-blocking crosspoint matrix enables every telephone station to be using the system at the same time, without having to wait for a necessary communication path to become available in the crosspoint matrix. The selection and actuation of specific signal paths in the crosspoint matrix is achieved through appropriate means, such as software.

BRIEF DESCRIPTION OF THE DRAWINGS

FIGS. 3a and 3b are a schematic diagram of a central office line card for use in the system of the present invention;

FIG. 5a is a block diagram of the data communication circuitry within each telephone station;

FIG. 8 is a flow chart of a routine for selecting communication paths through the cross point matrix.

DETAILED DESCRIPTION OF A PREFERRED EMBODIMENT

Figure 1:
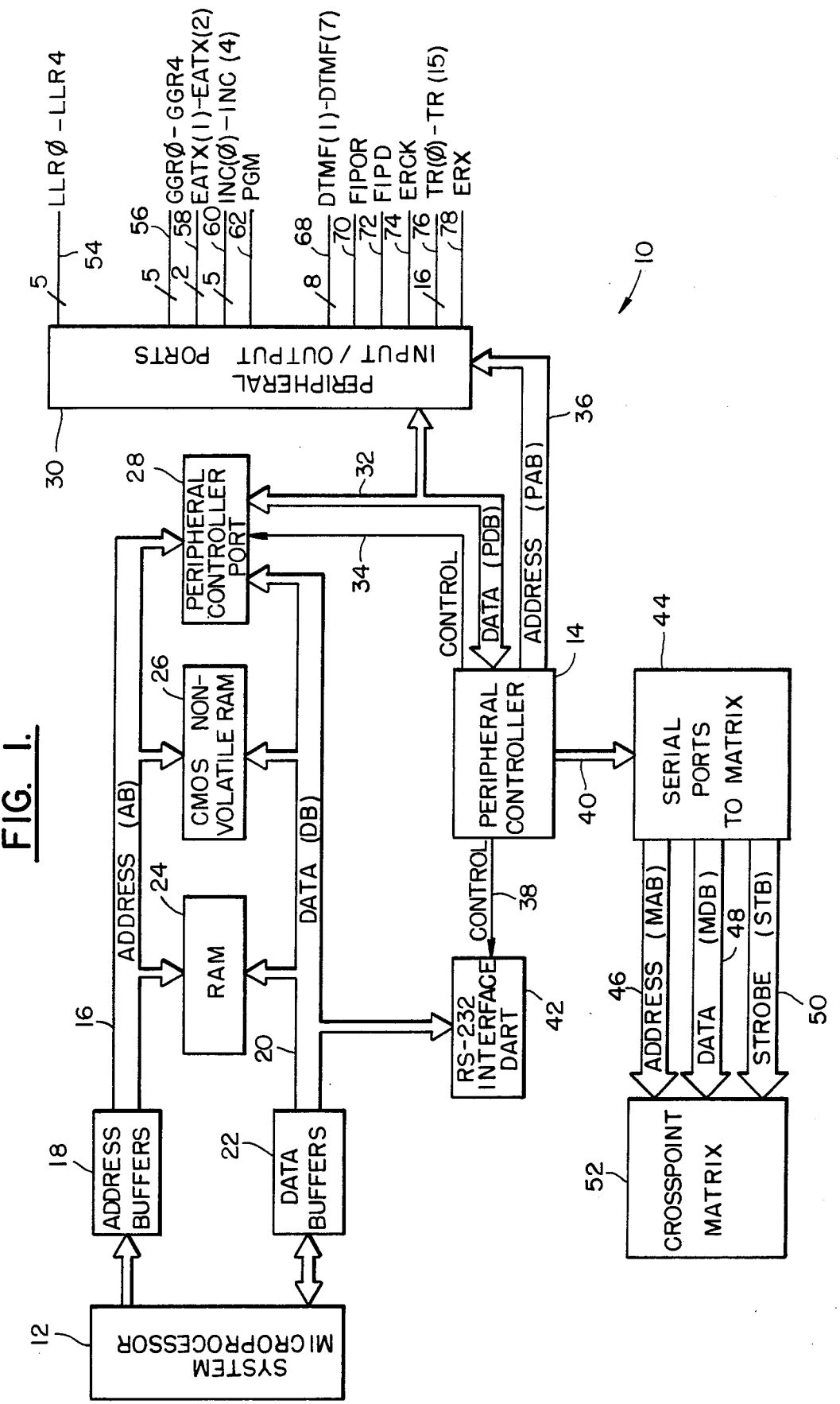
FIG. 1 is a block diagram of the central control circuitry of a telephone system in accordance with the present invention.

Turning now to FIG. 1, a block diagram is shown which depicts a central control scheme 10 which can be used to implement a telephone system in accordance with the present invention. Central control 10 includes a system microprocessor 12 which communicates through a peripheral controller 14 to the telephone system components. Microprocessor 12 communicates address data to address bus 16 through address buffers 18. Similarly, data is communicated to and from system microprocessor 12 and data bus 20 across data buffers 22. Random access memory ("RAM") 24 and CMOS non-volatile RAM 26 are coupled to system microprocessor 12 in a conventional manner. CMOS non-volatile RAM 26 is used to store system configuration information entered when the system is installed. Such information would, for example, implement certain optional features available to the system purchaser, and can be loaded from RAM 26 at system start-up into system RAM 24.

Communication to peripheral controller 14 takes place via peripheral controller port 28, which is addressed by system microprocessor 12 via address bus 16. Data flow between system microprocessor 12 and peripheral controller port 28 occurs over data bus 20. Communication between peripheral controller port 28 and peripheral controller 14 occurs over data bus 32. Control signals from peripheral controller 14 to peripheral control port 28 travel over control line 34.

In communicating with most of the telephone system circuitry which is external to the central controller, peripheral input/output ports 30 are used. An RS-232 interface dual asynchronous receiver/transmitter ("DART") 42 is also provided to enable the system to interface with peripheral apparatus, such as a printer. Peripheral controller 14 addresses peripheral input/output ports 30 via address bus 36. Data is communicated from peripheral controller 14 to peripheral input/output ports 30 across data bus 32. Various signals which are input to or output from peripheral input/output ports 30 include the following:

| Line No. | Label | Definition |
| --- | --- | --- |
| 54 | LLR0-LLR4 | Loop Relays |
| 56 | GGR0-GGR4 | Ground Relays |
| 58 | EATX(1)-EATX(2) | External Tone Generator |
| 60 | INC(0)-INC(4) | Incoming Call Detection |
| 62 | PGM | Installer Switch |
| 68 | DTMF(1)-DTMF(7) | Dial Tone Generator |
| 70 | FIPOR | Installer's Display |
| 72 | FIPD | Installer's Display |
| 74 | ERCK | Installer's Display Clock |
| 76 | TR(0)-TR(15) | Telephone Station Data |
| 78 | ERX | Receive Enable |

Figure 3B:
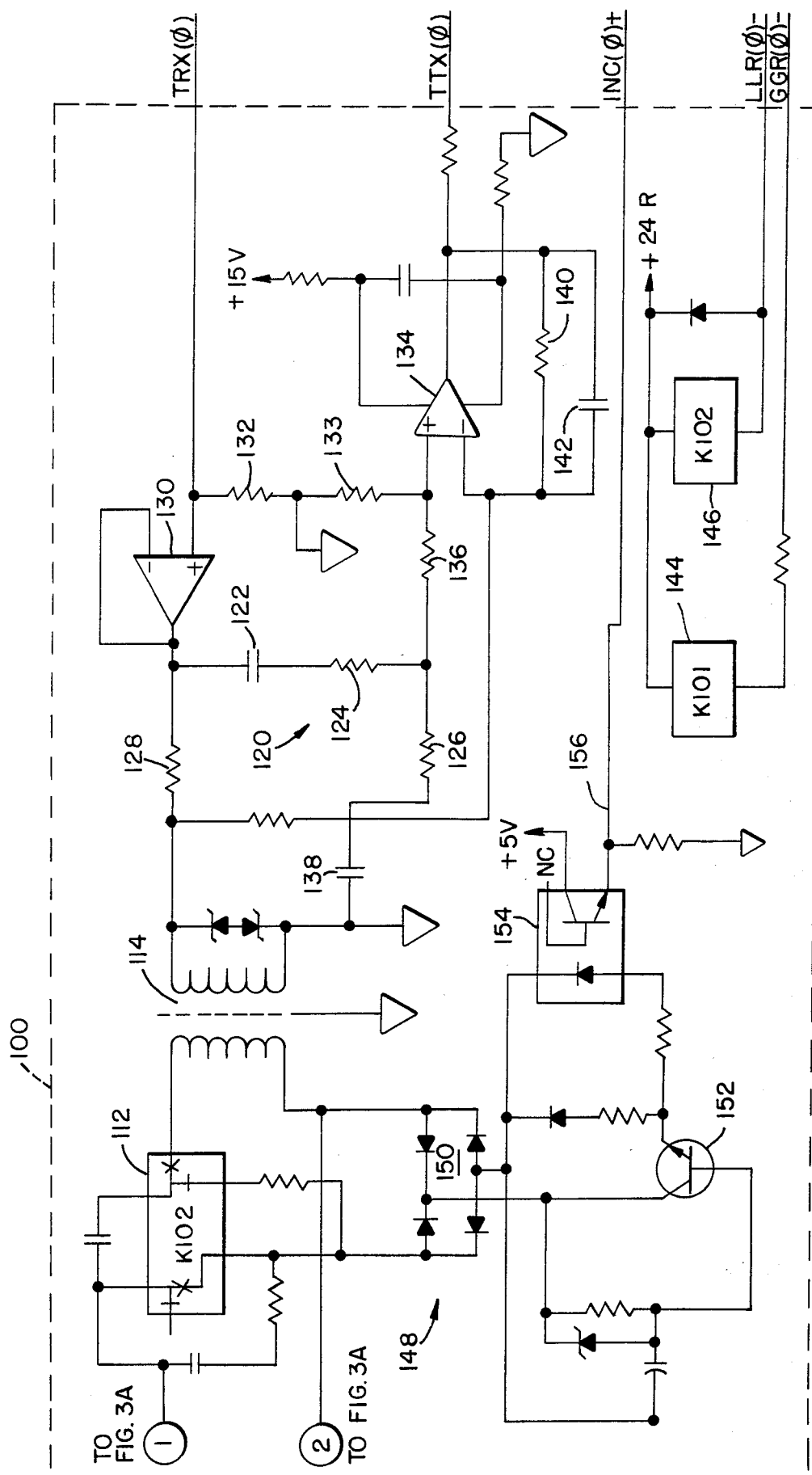

The looped relay signals LLR0 to LLR4 and the ground relay signals GGR0 to GGR4 are coupled to the central office line circuitry shown in FIGS. 3a and 3b. In the system shown in the figures, five telephone trunk lines are accomodated. More or fewer trunk lines could be accomodated in a system in accordance with the present invention, as will be appreciated by those skilled in the art. Each of the telephone trunk lines coupled to the system, such as telephone trunk #1, is interfaced through trunk line circuitry such as that shown in box 100. Identical circuitry is contained in boxes 102, 104, 106, and 108 associated with telephone trunks 2, 3, 4, and 5 respectively. The interface circuitry contained in each of these boxes couples the lines provided by the telephone company to the key telephone system of the present invention.

As shown in box 100, the tip and ring lines T1 and R1 for trunk #1 are coupled through relays 110 and 112 to a transformer 114 in a conventional manner. Relay 110 is a power failure relay which enables telephone communication to continue even when power to the key telephone system is interrupted. Switches 116 and 118 can be closed to provide a ground flash signal which is useful for certain optional features. Transformer 114 together with resistor 128 and cancellation network 120 serves to separate the combined voice transmit and receive signals on tip and ring lines T1 and R1 into separate receive and transmit signals. Cancellation network 120 comprises capacitors 122, 138 together with resistors 124, 126. The voice or audio signals received from telephone stations or audio portions of the key telephone system are designated by the notation TRX (n) where n refers to the trunk line to which the signal is communicated. In the case of trunk #1, the telephone receive signal is designated TRX(0) as shown in FIG. 3b. This signal is amplified by amplifier 130 and communicated to the trunk line (tip and ring lines T1 and R1) via transformer 114 and relays 112, 110. Similarly, voice signals from trunk #1 are communicated across relays 110, 112, and transformer 114 to amplifier 134. The output of amplifier 134 is coupled to telephone transmit line TTX(0) which, as explained hereinbelow, is coupled to a telephone station or stations which are to receive the voice signal. Resistors 132, 133 and 136 maintain the separate telephone receive and telephone transmit signals in a balanced condition and provide a proper impedance for the signal transmission. Capacitor 142 and resistor 140 provide feedback for the operation of amplifier 134 in a conventional manner.

The actuation of relays 110 and 112 is controlled by relay coils 144 and 146, respectively. Coil 144 is energized by ground relay signal GGR(0). Coil 146 is energized in response to loop relay signal LLR(0). As noted above, the loop relay and ground relay signals are generated by the central control circuitry 10 (FIG. 1) and output from peripheral input/output ports 30 on lines 54 and 56, respectively.

Detection of an incoming call is accomplished by the circuitry generally designated 148 in FIG. 3b. Ring current on the trunk line is rectified by diode bridge 150 and turns on transistor 152. Current from transistor 152 energizes optically coupled isolator 154, thereby producing an incoming call signal INC on output line 156 thereof. Incoming call signals from each of the trunk lines are input to peripheral input/output ports 30 as indicated at line 60 shown in FIG. 1. The incoming call signals will be decoded by the central control circuitry so that incoming calls can be answered by one or more designated telephone stations.

As noted above and indicated in FIG. 3A, separate but identical central office line card circuitry is provided for each telephone trunk to which the key telephone system is connected. The input lines from each trunk line comprise the T, R, PFT, and PFR signals. The outputs from the interface circuitry for each trunk line comprise the TRX, TTX, INC, GGR, and LLR signals.

The EATX signals from line 58 of peripheral input/output ports 30 (FIG. 1) provide an external tone which is used, for example, to drive one or more external loudspeakers (e.g. mounted in the ceiling of an office or factory). Such a tone can be used to alert personnel that an announcement will follow, or to provide a central ringing signal. Other uses for such an external tone will be apparent to those skilled in the art. The tone is coupled to the external loudspeaker through the crosspoint matrix via the auxiliary audio processing circuitry shown in FIG. 7.

Figure 7:
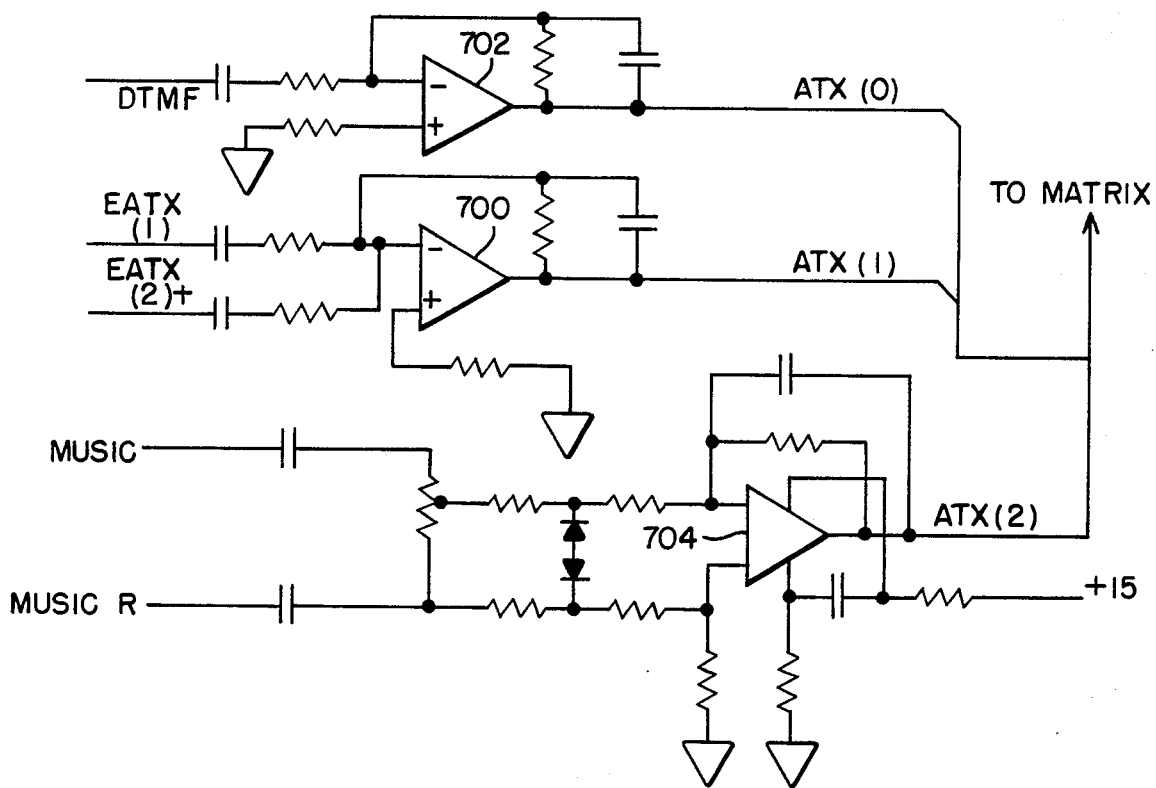
FIG. 7 is a schematic diagram of circuitry for coupling miscellaneous audio signals to the crosspoint matrix.

The external tone signals EATX(1) and EATX(2) from peripheral input/output ports 30 are input to amplifier 700 (FIG. 7). This amplifier produces a signal designated ATX(1) which is an audio tone signal that is input to the crosspoint matrix. The crosspoint matrix, upon instructions from central control circuitry 10, will couple the audio tone single ATX(1) to one or more designated external devices.

The audio processing circuitry of FIG. 7 also is used to couple the multi-frequency dial tones used to place outside telephone calls to the telephone trunk lines. Signals DTMF(1) and DTMF(7) from line 68 of peripheral input/output ports 30 drive a conventional dual tone multi-frequency integrated circuit chip (not shown). The output of the DTMF chip is input to amplifier 702 (FIG. 7) which produces an output signal designated ATX(0). This signal is an audio signal containing the dual tone multi-frequency, and is coupled to the crosspoint matrix. Upon instructions from central control unit 10, the crosspoint matrix couples the ATX(0) signal to outgoing trunk lines as appropriate.

An additional section of the auxiliary audio circuitry of FIG. 7 enables music to be input to the crosspoint matrix via amplifier 704. The output of this amplifier is a signal designaed ATX(2) which carries the music signal. Upon appropriate instructions from the central control circuitry 10, the music can be coupled to individual telephone stations throughout the key telephone system or to telephone trunk lines. One use for this feature is to provide music when a telephone station, or an incoming call is placed on hold.

Figure 4A:
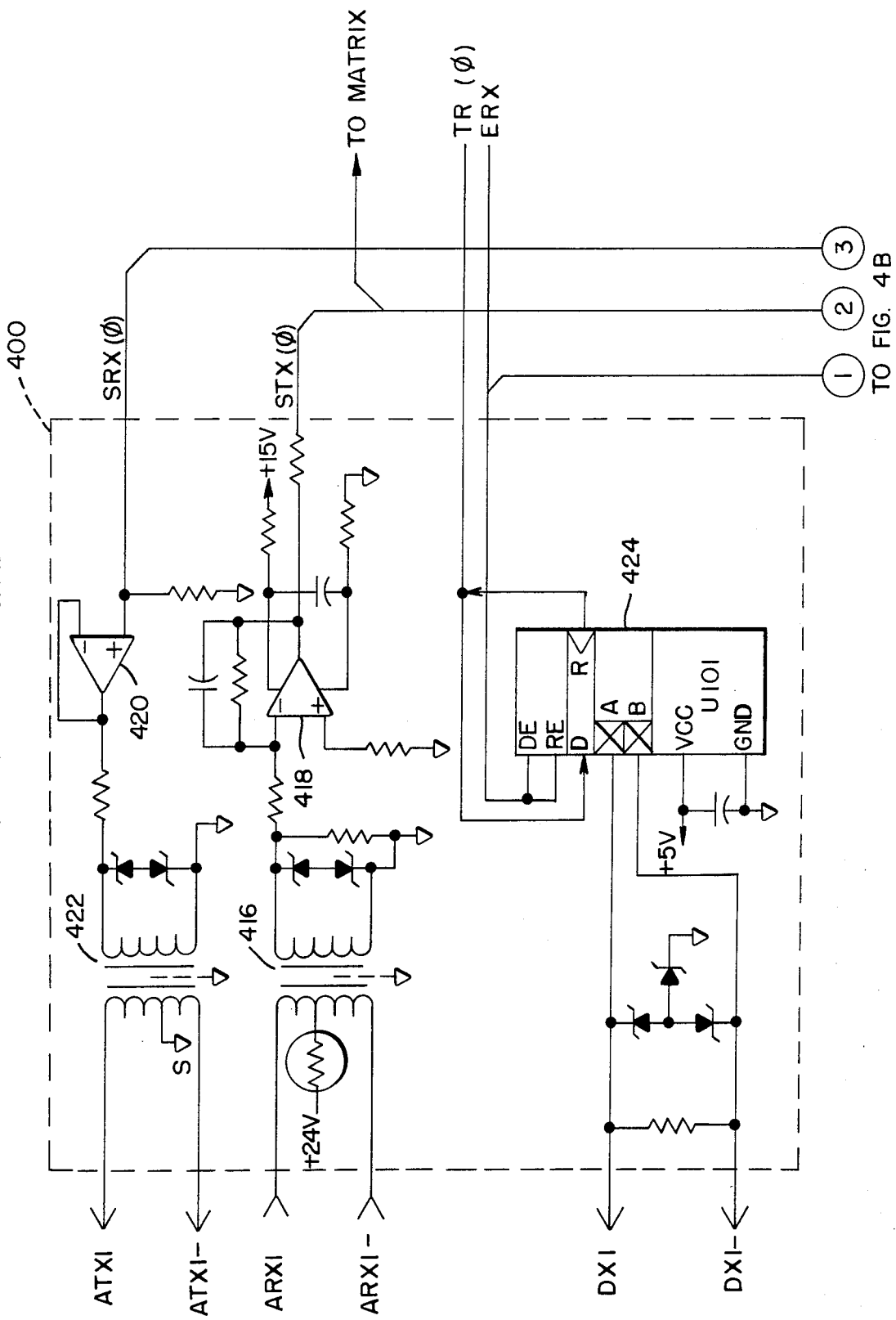
FIGS. 4a and 4b are a schematic diagram of a station interface card for use in the system of the present invention.
Figure 4B:
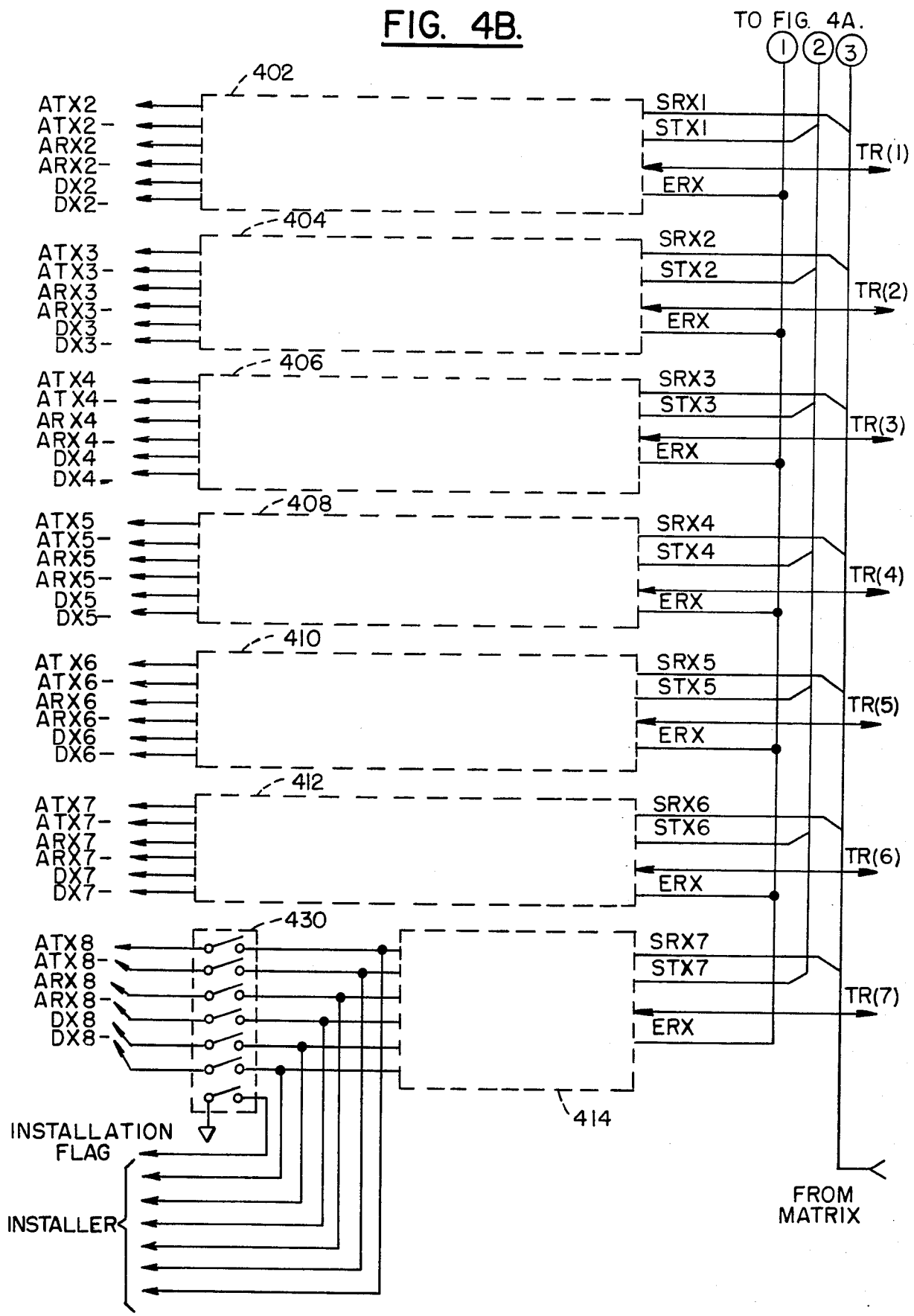

In order to couple individual telephones ("telephone stations") to the key telephone system, station interface circuitry is provided as shown schematically in FIGS. 4A and 4B. The circuitry shown in FIGS. 4A and 4B will accomodate 8 separate telephone stations. Those skilled in the art will recognize that additional station interface circuitry can be provided to accomodate a greater number of telephone stations, for example 16 such stations. The circuitry shown in box 400 provides an interface between one telephone station and the rest of the key telephone system. Identical circuitry in each of boxes 402, 404, 406, 408, 410, 412, and 414 interfaces with seven other telephone stations.

With reference to box 400, signals ARX1 and ARX1- are input from a telephone station to transformer 416. The output of transformer 416 is input to audio amplifier 418, which produces an output signal designated STX(0). This signal is coupled to the system crosspoint matrix as indicated.

Similarly, a signal designated SRX(0) is transmitted from the crosspoint matrix to an amplier 420. The output of amplifier 420 is coupled to transformer 422, and from the transformer to the telephone station as signals designated ATX1 and ATX1-. It will be appreciated that the audio signals coupled to and from a telephone station, namely those signals designated ATX1, ATX1-, ARX1, and ARX1- comprise 4 separate lines or wires. An additional two wires are used for data communication between the central control circuitry 10 (FIG. 1) and each individual telephone station. The data signals pass between the central control circuity 10 and the telephone stations via the station interface circuitry shown in FIGS. 4A and 4B.

As shown in box 400 of the station interface circuitry, data signals (DX1, DX1-) are communicated from a telephone station to central control circuitry 10 via a differential bus transceiver 424 which may, for example, be an integrated circuit chip of the type designated SN75176 manufactured by Texas Instruments Inc. of Dallas, Tex. Differential bus transceiver 424 receives a receive enable signal designated ERX from central control circuitry 10 over line 78 coupled to peripheral input/output ports 30 (FIG. 1). This signal is output by the peripheral controller 14 to enable reception of data from the telephone station. When ERX is not active, peripheral controller 14 can transmit to the telephone station at any time. Thus, when ERX is not active, the telephone station is essentially "standing by", ready to receive data. Data to or from central control circuitry 10, designated TR(n) where n designates the telephone station to or from which data is being transferred, flows between peripheral input/output ports 30 (FIG. 1) and differential bus transceiver 424 (FIG. 4A) via lines 76.

As indicated in FIGS. 4A and 4B, each telephone station is coupled to the station interface circuitry through four audio lines (ATX, ATX-, ARX, ARX-) and two data lines (DX, DX-). Communication of the audio signals to the crosspoint matrix occurs across two lines (SRX, STX) and data flow between the station interface circuitry and the central control circuitry occurs on lines TR and ERX.

FIG. 4B also shows a switch 430 which is used by an installer to place the key telephone system in an installation mode. When in the installation mode, the telephone station connected to the interface circuitry in box 414 can be used by the installer to program various features into the CMOS non-volatile ram 26 of the central control circuitry. Signals designated PGM, F1POR, F1PD, and ERCK, coupled to peripheral input/output ports 30, are used when the system is being installed and provide a display which prompts an installer as he enters data through the telephone station coupled to box 414.

Figure 5B:
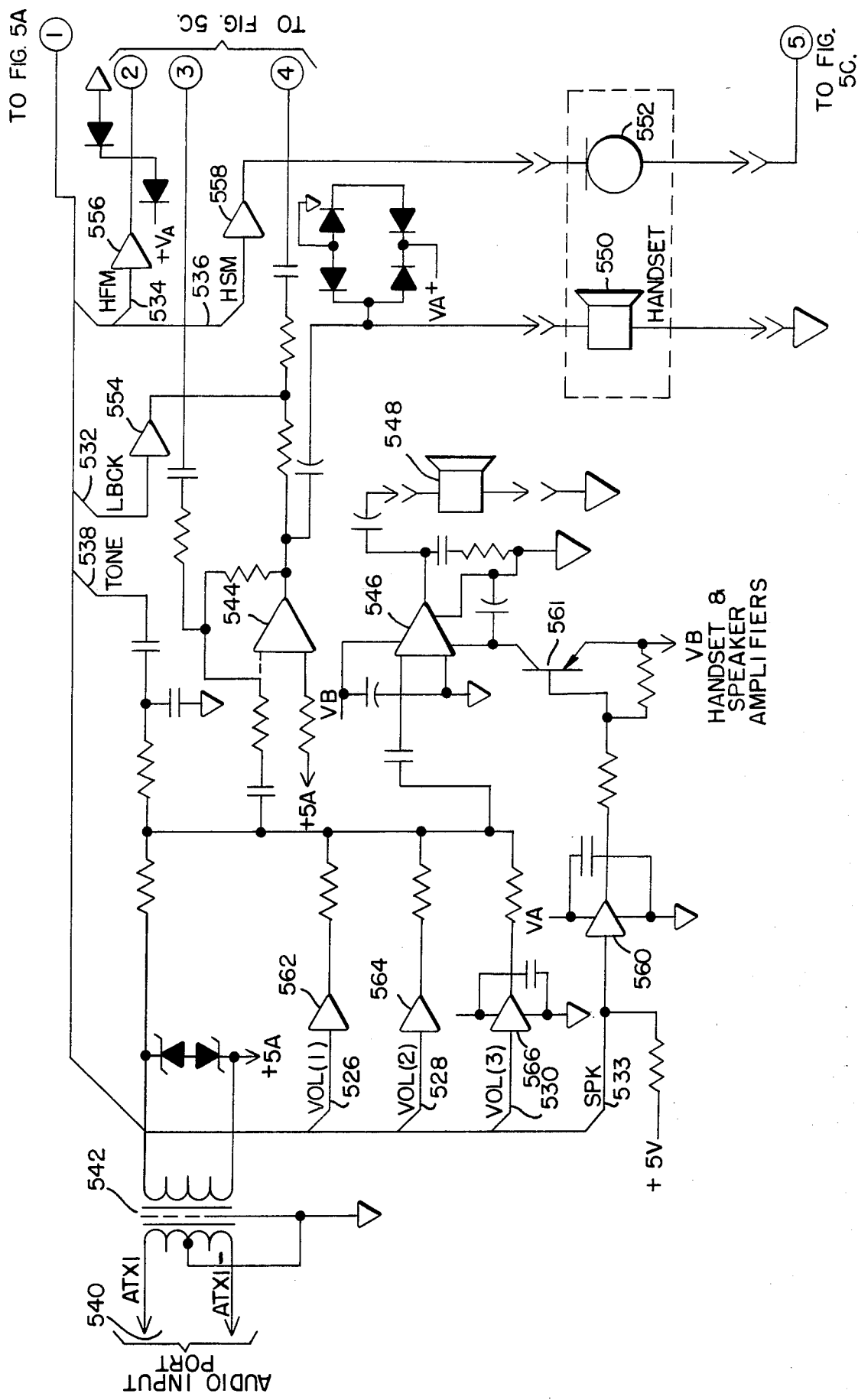
FIGS. 5b and 5c are schematic diagram of the audio circuitry within individual telephone stations.
Figure 5C:
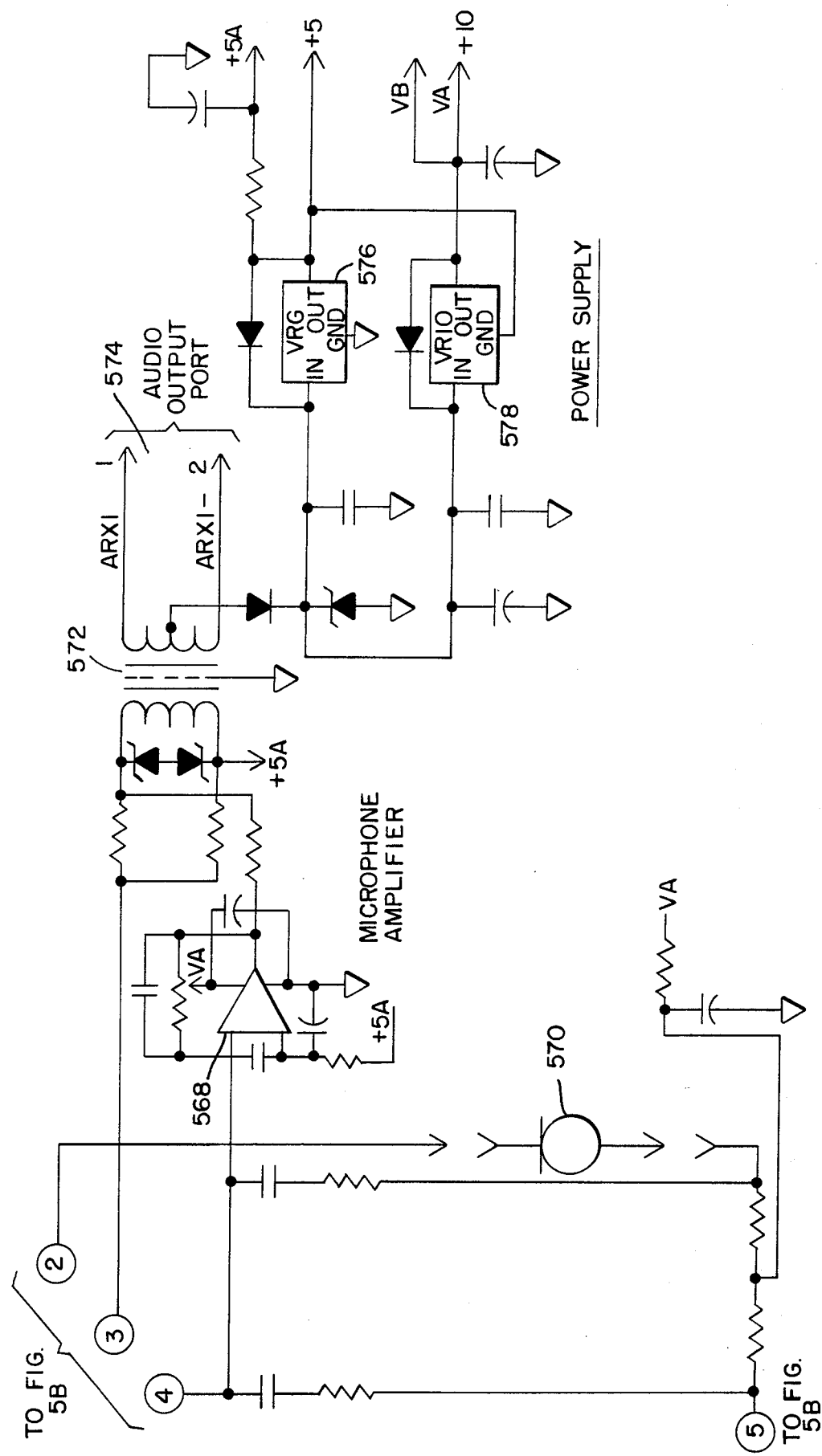

FIGS. 5A, 5B, and 5C show the circuitry which is contained in each individual telephone station used with the key telephone system of the present invention. FIG. 5a is a block diagram of the digital circuitry which handles data flow. Each telephone station includes a microprocessor 502 which executes all commands passed thereto by the peripheral controller 14 of central control circuitry 10 and replies to the central control circuitry as to the status of each key (i.e., switch) in the telephone station. Such keys include the telephone key pad used for dialing telephone numbers, as well as various keys which are used to initiate features of the key telephone system. Each of the feature switches can have an LED indicator associated therewith, to provide feedback to the telephone station user that a switch has been actuated and/or a function is selected.

In a preferred embodiment, the switches in the telephone station are arranged in a matrix, and the status of each switch is determined by telephone station microprocessor 502 by scanning the matrix in a conventional manner. Data from telephone station microprocessor 502 travels on data bus 504 to a switch scan and LED drive decoder 508. A strobe signal from telephone station microprocessor 502 is coupled to switch scan and LED drive decoder 508 via line 506. The switches and LED indicators 514 of the telephone station are scanned by switch scan and LED drive decoder 508 via switch scan lines 510. An LED drive signal from decoder 508 is coupled to the LED indicators via lines 512. During the switch scan process, the switch data is detected by telephone station microprocessor 502 on the basis of data returned over switch status lines 516.

Telephone station microprocessor 502 also controls the transmission of data between the telephone station and the central control circuitry. Such data is communicated across the telephone station data port 520. A transmit enable signal 522 is input from telephone station microprocessor 502 to a transceiver 518. Bidirectional data line 524 couples transceiver 518 to telephone station microprocessor 502. The input/output bus port of transceiver 518 carries the DX1 and DX1- signals which communicate between the telephone station and the station interface circuitry shown in FIGS. 4A and 4B. Transceiver 518 is essentially identical to differential bus transceiver 424 used in the station interface circuitry (FIG. 4A).

Telephone station microprocessor 502 is connected to the audio circuitry of the telephone station via lines 526, 528, 530, 532, 533, 534, 536, and 538. Each of these lines is coupled, as shown in FIG. 5B, to control a function of the audio circuitry.

Referring now to FIGS. 5B and 5C, an audio signal to be received by the telephone station is communicated through audio input port 540. Signals ATX1 and ATX1- from the station interface circuitry shown in FIG. 4 are coupled to transformer 542, which transfers the audio signal to the input of various amplifiers. One such amplifier is handset amplifier 544, which drives speaker 550 located in the handset of the telephone station. Another such amplifier is speaker amplifier 546, which drives hands free speaker 548 located in the case of the telephone station. The provision of speaker 548 enables a telephone station user to receive an audio signal without having to pick up the telephone handset. The volume of the sound from speakers 550 and 548 can be controlled by a user, by actuating appropriate switches in the telephone station. The actuation of such switches will be detected by station microprocessor 502 which, in turn, will output appropriate volume signals on lines 526, 528, and 530. The volume signals are coupled through buffers 562, 564 and 566 to the input circuitry of amplifiers 544 and 546. Speaker 548 can be turned on or off by telephone station microprocessor 502 via line 533. The speaker on/off signal, designated SPK, is coupled through buffer 560 to a transistor 561 that controls amplifier 546.

Other features controlled by telephone station microprocessor 502 include a loop back "LBCK" signal for use in testing the audio circuitry of the telephone station, and a signal for generating an audible signalling tone "TONE" which is output from either handset speaker 550 or the hands free speaker 548.

Telephone station microprocessor 502 also controls the use of a handset microphone 552 or hands free microphone 570. When the handset microphone is to be used, a signal designated HSM is coupled to handset microphone 552 through buffer 558. When the hands free microphone 570 is to be used, a signal designated "HFM" is coupled thereto through buffer 556.

The output of either handset microphone 552 or hands free microphone 570 is coupled to microphone amplifier 568. The audio output from microphone amplifier 568 is coupled to transformer 572 which connects the telephone station, through audio output port 574, to the telephone station interface circuitry. The audio output signals from the telephone station are designated ARX1 and ARX1-, for the telephone station shown in FIGS. 5A through 5C.

Power for the telephone station is received from the same lines that couple the audio signals from audio output port 574 to the station interface circuitry. Voltage regulators 576 and 578 are provided to produce the various voltages needed by the telephone station circuitry.

Figure 2:
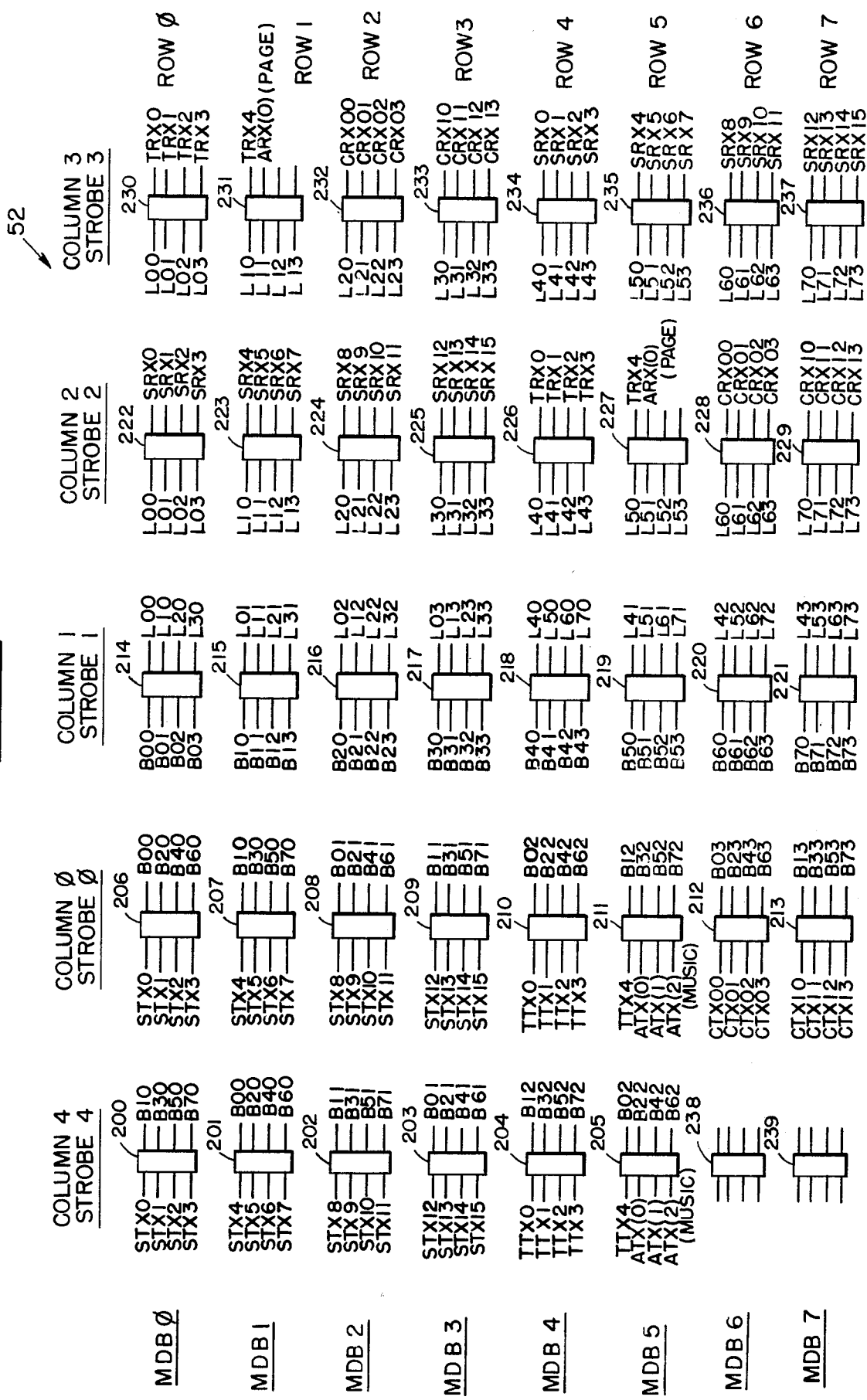
FIG. 2 is a diagram showing the arrangement of a plurality of crosspoint matrix switches in accordance with the present invention.
Figure 6:
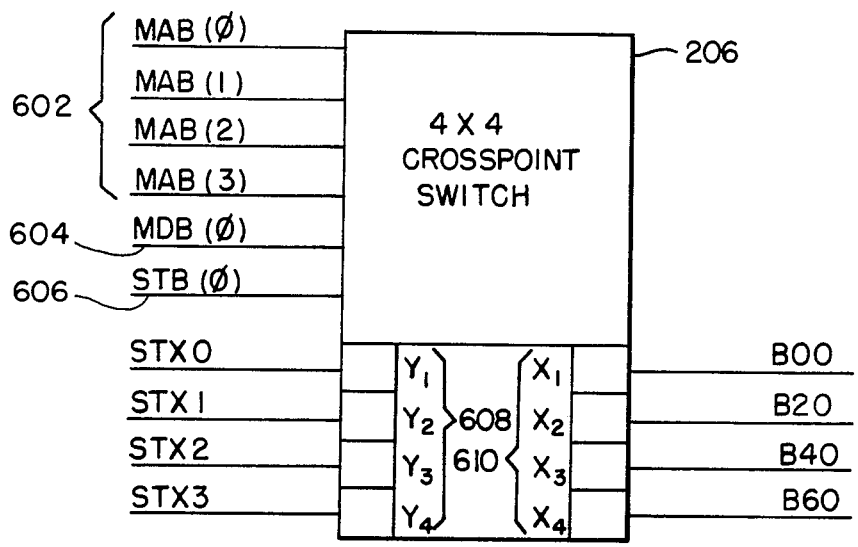
FIG. 6 is a diagram showing a crosspoint switch of the type used in the matrix of FIG. 2.

The crosspoint matrix of the present invention will now be described in detail with reference to FIGS. 2 and 6. FIG. 2 shows one layout of a crosspoint matrix 52 which can be used to interconnect the various audio signals between telephone stations and telephone trunk lines. The crosspoint matrix comprises a plurality of crosspoint switch units 200–239 arranged in columns and rows. Each horizontal row of crosspoint switch units is coupled to a different matrix data bit, as indicated by the notation MDB0 through MDB7. Each vertical column of crosspoint switch units is coupled to a different strobe line, as indicated by the notation STROBE 0 through STROBE 4. The crosspoint switch units shown are 4×4 crosspoint switches with control memory, for example, the type CD22100 COS/MOS crosspoint switches manufactured by RCA Corporation. An example of such a crosspoint switch unit, in particular unit 206 of FIG. 2, is shown in FIG. 6. Any one of the 16 crosspoints (X-Y combinations) can be selected by applying an appropriate four-bit address via address lines 602. The matrix address bits ("MAB") are generated by the central control circuitry. As indicated in FIG. 1, peripheral controller 14 inputs the crosspoint address data to serial ports 44 via data bus 40. The serial ports 44 then transfer the address data along address bus 46 to crosspoint matrix 52. The matrix data bits (MDB) and the strobe signals (STB) are also generated by central control circuitry 10 and follow a similar path as the matrix address bits, on data and strobe buses 48 and 50, respectively.

As shown in FIG. 6, the MAB, MDB, and STB signals are all input to the crosspoint switch units on lines 602, 604, and 606 respectively. When a crosspoint switch unit is addressed in accordance with the MAB data, and strobed by the STB signal, a connection between one of the Y terminals 608 and one of the X terminals 610 will be made or broken. A selected transmission gate is turned on or off by applying a logical 1 or 0, respectively, to the data input line 604 (MDB) and strobing the strobe input 606 to a logical one. Any number of the transmission gates can be on simultaneously.

The address, data, and strobe inputs of each crosspoint switch unit 200–239 are not specifically shown in FIG. 2. It will be understood, however, that the desired connections will be made to each crosspoint switch unit as exemplified by the connections to crosspoint switch unit 206 shown in FIG. 6.

FIG. 2 shows how the various crosspoint switch units are connected to the different audio signals present in the key telephone system. The layout of the cross point switch units in FIG. 2 results in a non-blocking matrix which enables telephone stations to be interconnected with each other, with telephone trunk lines, and with auxiliary audio signals without limitation.

In the matrix, a first group of addressable crosspoint switches 200–213 (together with expansion switches 238 and 239) is used to couple selected transmit signal paths (i.e., all signals designated by the root "TX") to selected first link points (i.e., points beginning with the letter "B"). As already noted, those transmit signals designated "STX" are audio signals output from the station interface circuitry, all signals designated "TTX" are output from the central office interface circuitry (FIGS. 3A and 3B), and all signals designated "ATX" are output from the auxiliary audio processing circuitry of FIG. 7. The transmit signal paths designated "CTX"

are conference call signals which enable telephone stations within the system to access two or more trunk lines simultaneously.

The crosspoint matrix further includes a second group of addressable crosspoint switches 222 to 237 for coupling selected receive signal paths (i.e., those signals including the root "RX") to selected second link points (i.e., those points beginning with the letter "L"). The "SRX" signals are inputted to the station interface circuitry of FIGS. 4A and 4B and are coupled therefrom to audio input ports of telephone stations. The "TRX" signals are input to the central office interface circuitry and are coupled therefrom to the telephone trunk lines. The "CRX" signals are used for the conference call features of the telephone system.

The crosspoint matrix further includes a third group of addressable crosspoint switches 214 to 221 for coupling selected first link points to selected second link points. As shown in FIG. 2, each of the crosspoint switch units in the third group can couple certain "B" links to certain "L" links. Those skilled in the art will appreciate that the layout of the present matrix will enable the selective interconnection of telephone stations to each other and to telephone trunk lines. The matrix also enables auxiliary audio signals (e.g., DTMF tones, music, and external tones) to be selectively connected to telephone stations and/or trunk lines.

The control means necessary for completing duplex communication channels between different telephone stations and also between telephone stations and telephone trunk lines is provided by central control circuitry 10, and in a preferred embodiment by software resident in system microprocessor 12. The same control means is used to selectively couple auxiliary audio signals to telephone stations and trunk lines. System microprocessor 12 contains internal ROM for storing the control software. External ROM (not shown) can also be coupled to system microprocessor 12 in a conventional manner to provide additional storage for the necessary control software. External RAM can also be provided in a conventional manner.

Figure 9:
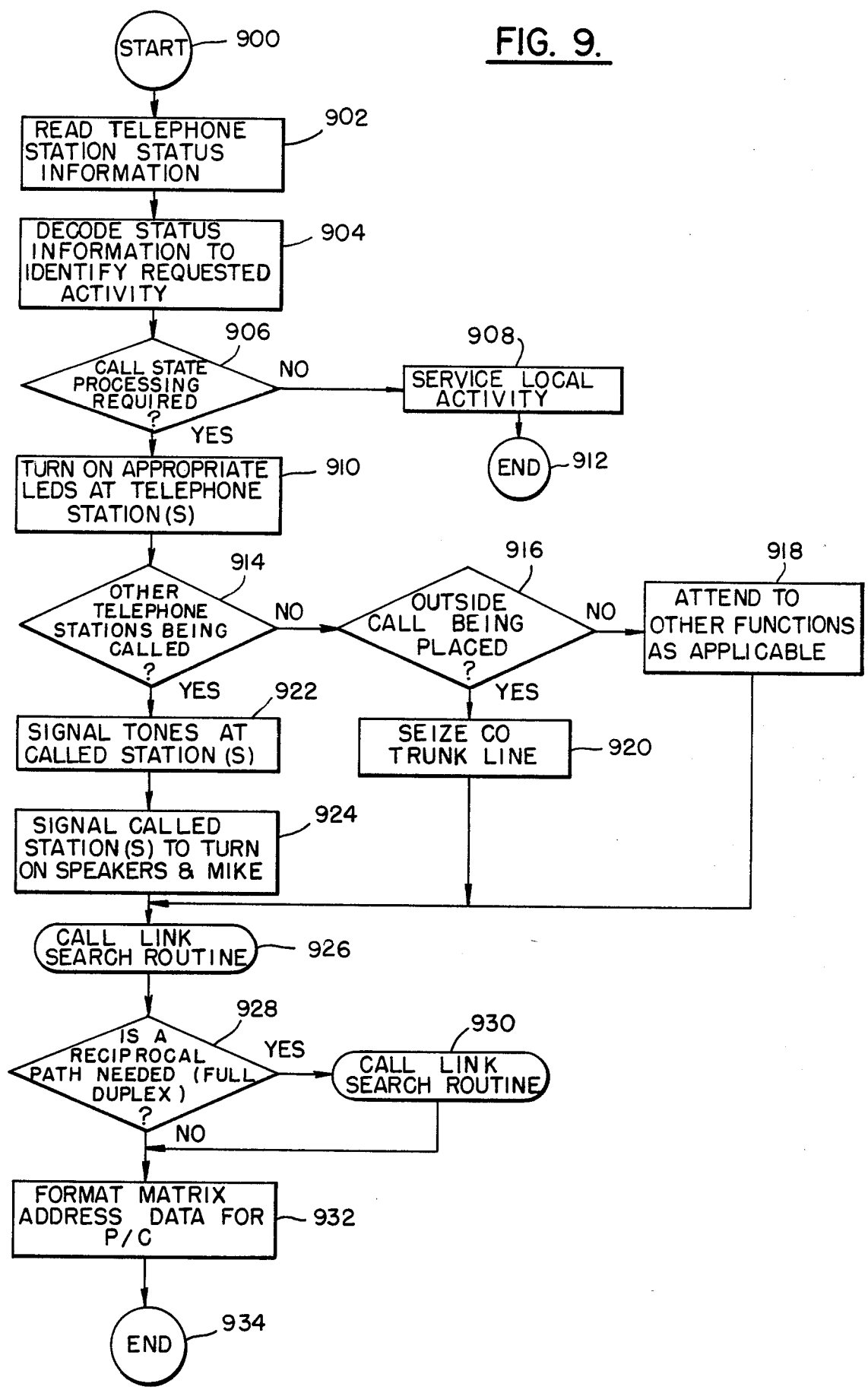
FIG. 9 is a flow chart of a system routine for processing calls.

A flow chart disclosing a control program which can be used for choosing communication channels is shown in FIG. 8. The routine shown in the flow chart is applicable to the matrix shown in FIG. 2. FIG. 9 is a flow chart showing, in general terms, the system routine for processing calls.

Turning first to FIG. 9, when a telephone station user initiates an action, such occurence is detected by the system microprocessor which is cycled to repeatedly read status information from the telephone stations. This is indicated at box 902 of FIG. 9. Status information from a telephone station is decoded by the system microprocessor at box 904 and the activity requested by the telephone station is identified. At box 906, the system microprocessor makes a determination, based on the requested activity, as to whether or not "call state processing" is required. Call state processing is generally required for those activities which require communication across the crosspoint matrix. All other activities are strictly local to the requesting telephone station. Thus, if call state processing is not required, program control is passed to box 908 and the local activity requested is serviced. Such activities may, for example, comprise changing the volume of the telephone station's audio output or switching from the hands free to the hand set microphone. Upon the servicing of any local activity requested, control is passed to box 912 where the subroutine ends until entered again.

In the event call state processing is required, control is passed to box 910 and any light emmitting diodes ("LED"s) required to be lit at the sending and receiving (if applicable) telephone stations are turned on. Then, at box 914, a determination is made as to whether the activity being serviced deals with the calling of other telephone stations in the system. If not, a determination is made at box 916 as to whether or not an outside call is being placed. If not, the other function being requested by the telephone station is attended to at box 918. Examples of such other functions include a request that music be turned on at the requesting telephone station, the transfer of a call from one station to another, call forwarding, leaving a message, requesting a call back, initiating a page, and initiating a barge communication.

In the event an outside call is being placed, control will be transferred from box 916 to box 920 and a central office trunk line will be seized for placement of the call. In the event another telephone station or stations are being called at box 914, control is passed to box 922 where the station(s) called are signalled by appropriate audible tones. Then, control passes to box 924 where each station being called is signalled, via its microprocessor, to turn on its internal speaker and microphone.

Once appropriate action has been taken depending on the specific activity requested by the telephone station being interrogated, control is passed to box 926 which calls a routine to search for a suitable communication path through the crosspoint matrix. The link search routine is shown in FIG. 8 of the drawings.

In order to follow the routine depicted in FIG. 8, further explanation of the crosspoint matrix shown in FIG. 2 is required. As shown in FIG. 2, the crosspoint matrix consists of five columns and eight rows. Column 1 comprises eight intermediate crosspoint switches each having four input "B" links and four output "L" links. Columns 0 and 4 comprise a plurality of transmitter crosspoint switches, each having four transmitter ports and four transmitter "B" links to which chosen transmitter ports can be selectively connected. Columns 2 and 3 comprise a plurality of receiver crosspoint switches each having four receiver ports and four receiver "L" links to which chosen receiver ports can be selectively connected. The intermediate crosspoint switches in column 1 collectively provide an input "B" link corresponding to each one of the transmitter links and an output "L" link corresponding to each one of the receiver links.

The signals coupled to the chips in columns 0 and 4 are arranged such that every transmitter input signal ("TX") can be coupled to every one of the intermediate crosspoint switches 214 to 221 in column 1. For example, the transmitter signal "STX0" is coupled to a transmitter port on each of chips 200 and 206. The transmitter links associated with chip 200 are those labeled B10, B30, B50, and B70. The transmitter links associated with chip 206 are those designated B00, B20, B40, and B60. The eight specified B links to which signal STX0 can be connected through crosspoint switches 200 and 206 are each, in turn, coupled to a different one of intermediate crosspoint switches 214–221. Thus, signal STX0 can be coupled selectively to any of crosspoint switch chips 214–221. In a like manner, every other transmitter input signal can be coupled to each of the intermediate crosspoint switches 214-221.

A similar layout enables every receive signal "RX" coupled to receiver crosspoint switches 222-237 (columns 2 and 3) to be coupled to every one of intermediate crosspoint switches 214-221 through the output "L" links.

The construction of the matrix is such that certain mathematical relationships will be inherent. Such relationships are advantageously used by the link searching routine to find a communication path for each communication channel to be established.

Each of the transmitter signal inputs to crosspoint switch chips 200-205 in column 4 and 206-213 in column 0 can be identified by a five bit code RRrII. The letters RRr identify the row in which a particular chip designated resides. The last two bits of the 5 bit code (II) designate the transmitter port on the particular chip. Thus, for example, to designate the transmitter port to which signal STX14 is connected in column 4, the five bit code 01110 is used. The leftmost three bits 011 (RRr) are the binary equivalent of the number 3. Crosspoint switch chip 203 resides in row 3 of column 4 of the matrix. The rightmost bits 10 (the digital representation of the number 2) designate that the signal STX14 is connected to transmitter port number 2 on crosspoint switch chip 203, where the ports are numbered port 0, port 1, port 2, and port 3 from the top to the bottom of the chip as shown.

Each receive port in columns 2 or 3 of the matrix can be described by a five bit code sSSOO in a similar manner. The leftmost bits sSS designate the row number of the crosspoint switch chip. The rightmost bits OO define the receiver port on a particular chip. For the matrix arrangement shown in FIG. 2, the leftmost bit of the row number sSS must be complemented to properly reference a chip in column 3. It will be appreciated that in order to specify a particular transmitter or receiver port in the matrix, all that is required is a five bit code together with the column number in which the crosspoint switch chip resides.

Other mathematical relationships which are inherent to the matrix shown in FIG. 2 will be appreciated as the description of the link searching routine shown in FIG. 8 proceeds. The routine in entered at box 800. In response to status information from a telephone station placing a call or other activity, the system will obtain (e.g., from a lookup table) a five bit code representative of a transmit port which must be utilized to establish a desired communication path. Similarly, a five bit code will be obtained which designates the receive port necessary to complete the desired communication path. At box 802 of FIG. 8, the five bit code RRrII for the designated transmit port is input. At box 804, the five bit code sSSOO for the designated receive port is input. Then, at box 806, a determination is made as to whether the last two bits II of the transmit port designation are odd. If not, control passes to box 808 which commences a search of the intermediate links in column 1 of the matrix from the bottom of the column (chip 221) to the top of the column (chip 214). If the last two bits II are odd, the search of the intermediate links will be commenced from the top of column 1 (chip 214) to the bottom of column (chip 221) as indicated at box 810. By performing some searches from the top to the bottom of column 1, and other searches from the bottom to the top of column 1, it has been found that a more efficient link searching routine results.

After the search direction is established, control passes to box 812 which determines if the type of communication channel to be established is one that can be minimized. Examples of communication channels that can be minimized are those used for the transmission of pages and music. A page enables one telephone station to communicate through an amplifier to various speakers in an office building. The music feature permits a telephone station to receive music from a central source, or provides music to an outside caller when on hold. Such types of communication can use shared lines, thereby reducing the number of crosspoints which are required to effect the necessary communication paths.

If a communication type is one that cannot be minimized, control will proceed to box 814 where a determination is made as to whether the RRth "B" link in the first crosspoint chip being looked at is free (i.e., not already in use). If it is free, control passes to box 816 where a determination is made as to whether the SSth "L" link in the crosspoint chip is also free. If so, an intermediate crosspoint has been found and no further searching is required. Control will pass to box 850 where the B and L link indentifiers will be stored. If either of the required B or L links in the first crosspoint chip is not free, control will be passed to box 818, which determines if there are more chips in column 1 to search. If there are, control proceeds to box 820 which causes the next successive intermediate link crosspoint chip to be looked at. Again, boxes 814 and, if applicable 816 would determine if the necessary crosspoint in the chip is free. Ultimately, either a crosspoint will be found or control will be passed to box 822, causing the system to give the user a reorder tone indicating that the desired communication path is not available at the moment. In such an instance, control passes to box 824 and the routine ends. As a practical matter, box 822 should never be reached. In a true non-blocking matrix, there would never be a situation where a communication path could not be established. However, in order to provide for all contingencies, box 822 has been included in the flow chart.

Turning now to the situation where a communication channel of a type which can be minimized is to be established, control will pass from box 812 to box 826 as shown in FIG. 8. The routine will determine if the RRth B link in the first crosspoint chip is free. If so, control will pass to box 828 and a determination will be made as to whether the SSth L link in the crosspoint chip is free. If so, control will pass to box 829 which will assign a low priority (3rd priority) to the B and L pair, and at box 830 the identifiers for this pair will be stored as a possible, but undesirable choice for the communication link. If, at box 828, it is found that the L link is not free, control will pass to box 821 which determines whether the link is in use by the same channel being routed. In other words, a determination will be made as to whether the SSth L link is already being used to carry the same signal which the new request is concerned with. If the L link is in use for the same channel now being routed, control passes to box 823 and a medium priority (2nd priority) is assigned to the B and L link pair. From box 823, control passes to box 830 via box 825 where the B and L link identifiers are stored as a possible, but undesirable choice. If the L link is determined at box 821 to be in use by a signal other than that now being routed, the link is not available for the new requested use and control passes back to box 838 via 827 so that the next chip can be searched.

If, at box 826, it was determined that the RRth B link in the crosspoint chip was not free, a determination will be made at box 832 as to whether the RRth B link is already in use by the same channel or signal which the link searching routine is presently trying to find a path for through the matrix. If the B link is not in use by the same channel, then it cannot be used for the new signal path and control will be passed to box 838 for the search to continue. If, on the other hand, the B link is already in use for the same signal which is currently being routed, control will pass to box 834. At this point, a determination is made as to whether the SSth L link in the crosspoint chip is also being used by the same channel for which a path is currently sought. If so, control passes to box 835 where the highest priority (1st priority) is assigned to the particular B and L pair. In this instance, no further searching is required, since a path already in use for the same channel has been found which can shared to complete the new request. Accordingly, control is passed to box 850 where the B and L link indentifiers are stored. This represents the best possible solution for the communication path of a signal that can be minimized. Such is the case because no new B or L links have to be used up from those available to complete the communication channel. Instead, a channel already in use is merely shared, since it is already carrying the same signal which the present request requires.

If, at box 834, it was determined that the SSth L link in the crosspoint chip is not being used by the same channel for which the new connection is to be made, control passes to box 836 which determines if the L link is free. If it is not free, it is in use for a different signal and therefore cannot be used for the present request. Thus, control passes to box 838 and the search for a suitable crosspoint continues. If the L link is free, then control passes to box 837 where the B and L pair is assigned a second priority, and stored at box 830 as a possible, but undesirable choice. The choice is undesirable because use of the particular B and L pair would use up an otherwise free L link. If possible, it is always desirable to share a B and L link pair with another communication path carrying the same signal.

In the event a first priority pair is not found in a particular crosspoint switch chip, control will be passed to box 838 where a determination is made as to whether or not there are additional chips to search. If so, the routine proceeds to the next intermediate crosspoint chip as indicated at box 848, and the search continues. Otherwise, control passes from box 838 to box 840 where a determination is made as to whether an undesirable choice was found. If so, control passes to box 850 via box 842 and the B and L link identifiers of the most desirable choice (i.e. the highest priority pair found) are stored. If it is determined at box 840 that no useable B and L pair was located, control passes to box 844 where a reorder tone is given to the telephone station user, and the routine then ends at box 846.

From box 850, where the identifiers for the B and L links to be used in completeing the communication path have been stored, control passes to box 852 which tests to determine if the exclusive "OR" of the bits RRr and the corresponding three bits defining the row number of the intermediate link crosspoint chip which contains the B and L link pair is true. If the exclusive "OR" is not true, then by construction, the appropriate transmit matrix chip to use will be the one from column 0 of the matrix which contains the transmit port coupled to the signal to be transmitted. This information is stored as indicated at box 854. If, on the other hand, the exclusive "OR" is found to be true, then by construction, it will be necessary to use the transmit matrix chip having the appropriate transmit port from column 4 of the matrix. Such information is stored at box 856.

Control then passes to box 858 where another test is made. In particular, the high order bit s of the receive crosspoint switch chip row number is tested to determine if it is equal to that of the row number of the chosen intermediate crosspoint chip from column 1. If the high order bit of the receive row number does not equal the high order bit of the column 1 chip row number then, at box 860, the first bit of the receive row number is complemented and this value is stored, together with an identifier which signifies that the proper receive crosspoint switch chip to be used is from column 3 of the matrix. If the high order bit s of the receive row number is equal to that of the row number of the chosen column 1 chip, then at box 862 an identifier is stored which designates that the receive crosspoint switch to be used is the one from column 2 of the matrix. Control is then passed to box 864, which returns control to the program depicted in FIG. 9.

Control will be returned to the flow chart of FIG. 9 at box 926, which immediately passes control to box 928. At this point, the program determines if a reciprocal path is needed for a full duplex communication channel. It will be appreciated that the link search routine just completed only established the crosspoints for a communication channel in one direction. In most instances, for example in station to station calls or calls where a station is connected to an outside line, a communication path will be needed in both directions. One path will transmit information from the telephone stations to the remote receiver, and the other communication path will carry the signal from the remote unit (e.g., telephone station or trunk line) back to the originating telephone station. If a reciprocal path is needed, control is passed to box 930 and the link search routine is called again to establish such path. Otherwise, control passes directly to box 932 where all of the B and L link identifiers, row, and column information estalished by the link searching routine (referred to as "matrix address data") is formatted for use by the peripheral controller in effecting the necessary matrix crosspoint connections. The status of all crosspoints in the matrix is stored in RAM and updated regularly. At this point, the program ends at box 934.

A copy of the software in object code form which controls the selection of communication paths in the matrix of the telephone system of the present invention is appended hereto and made a part hereof. The object code was compiled from a source program in the language "C" using a Vandata complier and is configured to run on a z-80 microprocessor.

It will now be appreciated that the present invention provides a key telephone system which uses four wires for transmission of voice and audio signals to and from the telephone stations which are part of the system. Communication paths are established through a crosspoint matrix having crosspoints which are selected by a link searching routine. The link searching routine takes advantage of certain relationships which are inherent in the organization of the matrix. In this manner, once intermediate crosspoint links are chosen, the identification of transmitter and receiver crosspoints follows by applying rules of construction. The link searching routine includes a minimizing function which seeks to share communication paths for communication types, such as paging and music, which do not need dedicated channels.

Although the present invention has been described in connection with a preferred embodiment thereof, many variations and modifications could be made. It is intended to cover all of the variations and modifications which fall within the scope of the present invention, as recited in the following claims.

APPENDIX

```
:200000009914BC016E063A010000000000006E06CD3306DD7E043274C6DD7E06327506DDE7
:200020007E08326E06212703346E065F9757197E326F063E01329B073A7506AF9747C5213C
:200040000200E5CDD505E17DE6035F3A7406B71FE60CF610B36F7D327A06E6C36F7D327121
:20006000063A74064F9747C5210200E5CDD505E15D78327E063EFF3C73063A7406E601290B
:200080002497327F06CD94033A7F06FE08D2B800CD170279B0C2B8003A7F06C601327F067E
:2000A000CDD10318E33E07327F06CD94033A7F06FE093014CD170279B0200D3A7F06D60169
:2000C000327F06CDD10318E53A7F06FE083810A7306FEFF28093A7306327F06CD94033AD5
:2000E0007F06FE08D20A013A75064F9747C5210200E5CDD505E15D7B3280063A7F06E60428
:20010000Q6F3A8006E6044F7DB9281C3A8006EE043280063E03328306181297329B073A9B00
:20012000074F9747C340063E203283063A7E06E6014F3A7F06E6014FAD6F28040E40190280
:20014000E00793281063A7406E60387876F3A81064FB56F3A7F06B71F4FB56F7D327806DC
:2001603A7006E60C6F3A83064FB56F3A7506E6034FB56F7D327C0697329A073A9A07FEB3
:200180003D2A3013A9A074F9747696029017906C9E5217E063A9A075F9757194E97476903
:2001A00060010F0209C17E023A9A07C601329A07C36C013A6E06FE03CAE8013A74064F97E2
:2001C00047C5C127073A7606EF975719CD5103F13A75064F9747C52147073A77065F97577C
:2001E00019CD5103F1216E063E02BE380B2184063A6E065F97571934216F063A7406B63249
:2002000074063A6E06327506210A00E5217406E5DD6E0ADD660BCD9B05F1F1C30E0115019F
:2002200002040810204080CD24063A77064F9747696029014707097E329D073A7406FE197D
:20024000381D3A7D07E64C20163A7E06E6014F3A7F06E6014FAD6F2806010000C32E063AAA
:2002600076064F9747696029012707097E329C07FEFFC295023A9D07FEFFC28002216E061E
:200280003E02BEDAC6023A6E064F9747696029018406C997963E00239EF2C6022102C0CD87
:2002A0002F03C3E8023A6E06FE03C2EE022175063A9C07BEC2E802210000CD2F03C3E8024E
:2002C0003A6E06FE0320152175063A9D07BE200C010100C32E06010100C32E06216E063E11
:2002E0002BE38143A9D07E6E06F3A6F064F7DB92006210100CD2F03010000C32E06216EDD
:200300063E02BE38F23A9C07E6E06F3A6F064F7DB920E43A9D07FEFF2009210000CD2F44
:200320003C3E8023A9D07E6E06F3A6F064F7DB9C2E802010100C32E06208040000000CD74
:2003400033063A7306FEFF2809219E07DD7E04BE300C3A7F06327306DD7E04329E07C340C1
:200360006CD3306216E063E02BE3815DD6E04DD66057EFEFF2017DD6E04DD660536011862
:2003800014DD6E04DD66005DD7E0677C34006DD6E04DD660534DD6E04DD66053A6F064F7EF3
:2003A00B17718E7CD24063A7F0687876F7D3270066F3A71064FB56F7D3277063A7A064FF6
:2003C0009747C5210200E5CDD505E17DE6035F7B3272066F3A70064FB56F7D327606C32E52
:2003E0006CD24063A7F0687876F7D3270066F3A71064FB56F7D3277063A72064F3A70062F
:20040000B16F7D327606C32E06CD3306DD7E06DDB607C23A049732A207DD6E04DD66057E12
:20042000E6E06F7D329F07DD6E04DD660523234E9747696029012707090D5F0579FEFFCA9E
:20044000AB043E0132A207C3AB049732A307DD6E04DD66052323232322A0073AA307FE031D
:20046000D2D042AA0077E32A507FE5C2D2043AA5074F9747696029018706097E32A607B8
:200480002AA007E5232322A007E1237E32A407DD7E06FE012C0D5DD7E07FE00C2E0043AA5CE
:2004A00074F9747696029018706093AA4075F97577EB377237EB277C30E05DD6E04DD6673
:2004C00052323234E9747696029014707090D5F0579FEFFCA3A043AA207F60232A207C310
:2004E0003A04C340063AA307C60132A307C34B04210F023AA3075F9757196E3AA2074FA55B
:200500002C1C3AA5074F9747696029018706093AA4072F4F5997577EA377237EA27721D70F
:2005200063AA5075F9757197EB7C2D5043AA5074F9747696029018706093AA6075F9757C9
:200540007EBB2003237EBACAD504210706C3AA5075F9757197EB720083A6707C60132670BB
:2005600021D7063AA5075F9757193601C3D504CD33063A9F07B72820DD6E04DD660535636E3F
:200580003A9F072F4FA52810DD6E04DD66053A9F074F7EB1774E1809DD6E04DD660536FF79
:2005A0004E7932A7074F9747034006CD3306DD5E04DD5605DD6E06DD6607DD4E09DD4609E7
:2005C00EDB0C34006E5C5210600397EB7F2C5052F3CC3E505CA47064723237E23666F291F
:2005E0010FDC31806E5C5210600397EB7F2E5052F3CC3C505CA47064723237E23666FCB15
:200600002CCB1D10FAC31806E5C5210600397EB7F208062F3CC3C505CA47064723237E235F
:20062000666FC33CCB1D10FA4D4421080039712370C34706E1DDE5DD210000DD39E9DDF96F
:20064000DDE1C9D1E3E5DDE5DD210000DD39EBE9DDF9DDE1E1F1E9210400394E23462371D8
```

```
:20066000237001E1F1C9F5210600394E234623232371237001282827101E1F1F1C9000012
:2007A00000000000000000000000000000000000000000000000009B050C5F636F707973
:2007C00062000000290300C5F6D6C7479706500001030C5F6C70656E6400000094030C5F31
:2007E0006C70696E697400000F020C5F626974473000000000040604632E3172657400000DC
:20080000D5050C632E6972736730000033060C632E6E656E740000005103005F6CE7365AF
:2008200074000C01702005566976E646C6765C00706005736861645F6740074060C5FC7
:200840006D6C696E6E000000700060C5F70317200000000C70705F736861645F65E00E0
:2008600087060C5F787074730000006F060C5F747970606D61736B006040305F6D756C741
:20088000636E74006E060C5F747970650000004707005F7374467320000000710660CF57
:2008A00073326C6F000000027070C5F7374467310000000720060C5F7331606F0000003E
:2008C0007E060C5F7074726F7700000073060C5F756E6465736972200000005F67657460FE
:2008E000696E6B068070C5F636F6E660000000081060C5F7074636F6L0000002E060C6375
:2009000023072657400000024060C632E306656E740000000E020C5F64747870672740060
:2009200F030C5F736574475E6E4500F030C5F73657467265650047060C632E6C7265A0
:200940007400000F80500C632E7572736800000085050C632E69607363680000002D060C6315
:160960002E6968C000000056060C632E7A7265740000000058
:00000001FF
```

What is claimed is:

1. A key telephone system comprising:
A plurality of telephone stations each having a two wire audio input port, a separate two wire audio output port, and a data port;
centralized station interface means coupled to each of said telephone stations for providing a station receive signal path for each two wire audio input port and a station transmit signal path for each two wire audio output port;
local loop interface means for dividing each of a plurality of telephone trunk lines into separate trunk transmit and trunk receive signal paths; and
crosspoint matrix means coupled between said centralized station interface means and said local loop interface means for interconnecting station transmit signal paths to station receive signal paths, station transmit signal paths to trunk receive signal paths, and trunk transmit signal paths to station receive signal paths;
said crosspoint matrix means including:
a first group of addressable crosspoint switches for coupling selected transmit signal paths to selected first link points;
a second group of addressable crosspoint switches for coupling selected receive signal paths to selected second link points;
a third group of addressable crosspoint switches for coupling selected first link points to selected second link points; and
control means for completing a duplex communication channel by addressing and actuating a first set of crosspoint switches from said first, second, and third groups to effect a connection from a transmit signal path to a receive signal path across first and second link points, and a second set of crosspoint switches from said first, second and third groups to effect a connection from the reciprocal transmit signal path to the reciprocal receive signal path across first and second link points.

2. The system of claim 1 wherein said control means comprises:
a microprocessor;
a peripheral controller coupled to communicate data from said microprocessor to said crosspoint matrix; and
means operatively associated with said microprocessor for selecting said first and second sets of crosspoint switches from different potential sets of such switches and for addressing the selected switches and actuating same to complete the required connections.

3. The system of claim 2 further comprising multiplexing means for enabling said microprocessor to address and actuate a plurality of first and second sets of crosspoint switches on a multiplexed basis to establish a plurality of duplex communication channels concurrently.

4. The system of claim 1 further comprising:
a microprocessor in each of said telephone stations having a data bus coupled to the telephone station data port;
a system microprocessor;
means for enabling said system microprocessor to determine the status of each telephone station by communicating with said telephone station microporcessors through said data ports; and
means for enabling said system microprocessor to select, address and actuate the crosspoint switches necessary to complete duplex communication paths dictated by status information from said telephone stations.

5. The system of claim 4 further comprising a peripheral controller coupled to communicate data between said system microprocessor and the telephone station microprocessors and between said system microprocessor and said crosspoint matrix.

6. The system of claim 4 further comprising:
means for detecting incoming calls on each of said trunk lines;
means for enabling said system microprocessor to monitor said incoming call detecting means; and
means for enabling said system microprocessor to signal the presence of an incoming call to at least one telephone station.

7. The system of claim 4 wherein each of said telephone stations comprises a plurality of function switches and a telephone keypad, and the status information provided by said telephone station microprocessors to said system microprocessor includes data identifying switches and keys which are actuated at the telephone station.

8. The system of claim 7 further comprising:
centralized means under the control of said system microprocessor for generating DTMF tones in response to the actuation of keys at said telephone stations; and
means for coupling the tones generated in response to key actuations at individual telephone stations to corresponding individual trunk receive signal paths via said crosspoint matrix means;
whereby outgoing calls can be dialed by the individual telephone stations using DTMF tone generating means shared by a plurality of such telephone stations.

9. The system of claim 4 further comprising:
an audio amplifier and loudspeaker in each of said telephone stations coupled to receive an audio input signal from the audio input port of the telephone station; and
hands free microphone means in each of said telephone stations coupled to transmit an audio signal through an audio amplifier to the audio output port of the telephone station;
whereby an audio signal from a first telephone station can be routed through said crosspoint matrix to a second telephone station for broadcast over the loudspeaker of the second telephone station, and an audio signal from the hands free microphone means of the second telephone station can be routed through said crosspoint matrix to said first telephone station.

10. The system of claim 9 further comprising:
means for generating a call announce tone in response to status information from said first telephone station indicative that a call is being placed to said second telephone station;
means for coupling said call announce tone through said crosspoint matrix to the audio input port of said second telephone station for broadcast over the second telephone station loudspeaker; and
means for coupling a signal from the audio output port of said first telephone station through said crosspoint matrix to the audio input port of said second telephone station and a signal from the audio output port of said second telephone station through said crosspoint matrix to the audio input port of said first telephone station.

11. A key telephone system having a non-blocking crosspoint matrix comprising:
a plurality of telephone stations having an audio output port and an audio input port;
a plurality of transmitter crosspoints coupled to said telephone station audio output ports;
means for selectively closing transmitter crosspoints to couple selected telephone station audio output ports to selected first link points;
a plurality of receiver crosspoints coupled to said telephone station audio input ports;
means for selectively closing receiver crosspoints to couple selected telephone station audio input ports to selected second link points;
a plurality of intermediate crosspoints coupled between said first link points and said second link points;
means for selectively closing intermediate crosspoints to couple selected first link points to selected second link points; and
control means for monitoring the status of each of said telephone stations and responding to an initiate call signal from an originating telephone station by:
(a) decoding said initiate call signal to ascertain the intended destination telephone station of the call being made;
(b) selecting and closing a first communication path across one each of said transmitter, receiver and intermediate crosspoints to couple the originating telephone station's audio output port to the destination telephone station's audio input port; and
(c) selecting and closing a second communication path across one each of said transmitter, receiver and intermediate crosspoints to couple the destination telephone station's audio output port to the originating telephone station's audio input port.

12. The system of claim 11 further comprising:
means for dividing each of a plurality of telephone trunk lines into separate trunk transmit and trunk receive signal paths;
means for coupling trunk transmit signal paths to transmitter crosspoints;
means for coupling trunk receive signal paths to receiver crosspoints; and
means for detecting the presence of an incoming call on a telephone trunk line and signaling at least one of said telephone stations that an incoming call is waiting to be answered;
wherein said control means further comprises means for responding to an answer call signal from an answering telephone station by:
(d) selecting and closing a communication path across one each of said transmitter, receiver, and intermediate crosspoints to couple the answering telephone station's audio output port to the trunk receive signal path for the trunk line carrying the incoming call; and
(e) selecting and closing a reciprocal communication path across one each of said transmitter, receiver, and intermediate crosspoints to couple the answering telephone station's audio input port to the trunk transmit signal path for the trunk line carrying the incoming call.

13. The system of claim 12 wherein each of said telephone stations comprises a plurality of function switches and a telephone keypad, and the status information monitored by said control means includes data indicative of the actuation of said switches and keys.

14. The system of claim 13 further comprising:
centralized means for generating DTMF tones in response to the actuation of keys at said telephone stations; and
means for coupling the output of said DTMF tone generating means to transmitter crosspoints;
wherein said control means further comprises means for responding to the dialing of an outgoing call by a dialing telephone station by:
(f) selecting and closing a communication path across one each of said transmitter, receiver, and intermediate crosspoints to couple the tones generated by said DTMF tone generating means to the trunk receive signal path for a trunk line selected to carry the outgoing call;
(g) selecting and closing a communication path across one each of said transmitter, receiver, and intermediate crosspoints to couple the dialing telephone station's audio output port to the trunk receive signal path for the trunk line carrying the outgoing call; and (h) selecting and closing a communication path across one each of said transmitter, receiver, and intermediate crosspoints to couple the dialing telephone station's audio input port to the trunk transmit signal path for the trunk line carrying the outgoing call.

15. A non-blocking crosspoint matrix for a key telephone system comprising:

a plurality of transmitter crosspoint switches each having transmitter ports and transmitter links to which chosen transmitter ports can be selectively connected;

a plurality of receiver crosspoint switches each having receiver ports and receiver links to which chosen receiver ports can be selectively connected;

a plurality of intermediate crosspoint switches collectively providing an input link corresponding to each one of said transmitter links and an output link corresponding to each one of said receiver links;

means for sequentially searching among said intermediate crosspoint switches to locate an input link and output link pair available to complete a connection between a transmitter link of a transmitter crosspoint switch having a transmission port coupled to a signal to be transmitted and a receiver link of a receiver crosspoint switch having a receiver port coupled to the signal's intended destination; and means for actuating the intermediate crosspoint necessary to connect the located pair, and for actuating the transmitter and receiver crosspoints required in view of the located pair to complete the desired signal path.

16. The matrix of claim 15 wherein said searching means comprises:

means for determining whether a given signal to be coupled through said matrix is of a type which can share a common signal path for distribution to different destinations; and means for assigning priority to input and output link pairs when the given signal is of said type with:

first and highest priority given to an input and output link pair when both the input link and output link are already in use to carry the same signal as the given signal;

second priority given to an input and output link pair when one of the input or output links is already in use for the same signal as the given signal and the other required link is free; and third and lowest priority given to an input and output link pair in which both links are free.

17. The matrix of claim 16 wherein said actuating means actuates the crosspoints necessary to couple the given signal through the matrix via the highest priority input and output link pair available.

* * * * *